(12) United States Patent
Kunii et al.

(10) Patent No.: US 6,647,139 B1
(45) Date of Patent: Nov. 11, 2003

(54) METHOD OF OBJECT RECOGNITION, APPARATUS OF THE SAME AND RECORDING MEDIUM THEREFOR

(75) Inventors: Mihoko Kunii, Tokyo (JP); Kenji Nagao, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/506,483

(22) Filed: Feb. 17, 2000

(30) Foreign Application Priority Data

Feb. 18, 1999 (JP) .......................................... 11-039539
Jun. 29, 1999 (JP) .......................................... 11-182875
Oct. 26, 1999 (JP) .......................................... 11-303658

(51) Int. Cl.[7] ................................................. G06K 9/62
(52) U.S. Cl. ...................................... 382/159; 382/190
(58) Field of Search ................................. 382/159, 171, 382/190, 195, 199, 206, 224; 700/47, 48; 706/16, 19, 25

(56) References Cited

U.S. PATENT DOCUMENTS 5,842,194 A * 11/1998 Arbuckle ..................... 706/52

* cited by examiner

*Primary Examiner*—Samir Ahmed
(74) *Attorney, Agent, or Firm*—RatnerPrestia

(57) ABSTRACT

According to a disclosed method, an image is learned beforehand, and an image of an object to be recognized is entered, then this object is recognized. An image including an object to be learned is entered, and it is divided into partial images. Further classifying into plural classes, a matrix for feature extraction is calculated in each class. A feature is calculated by using this matrix for feature extraction, and stored. Consequently, an image including an object to be recognized is entered, and it is divided into partial images. From the partial images, the feature of the object of recognition is calculated by using the obtained matrix for feature extraction, and the similarity measure of the both is calculated by using the data of the stored feature and the feature of the object of recognition, and the object is recognized.

20 Claims, 22 Drawing Sheets

METHOD OF OBJECT RECOGNITION, APPARATUS OF THE SAME AND RECORDING MEDIUM THEREFOR

FIELD OF THE INVENTION

The present invention relates to an object recognition method for recognizing an object from the image obtained from image input means, apparatus of the same and a recording medium in which the program of this method is recorded.

BACKGROUND OF THE INVENTION

Object recognition methods hitherto known include a feature extraction using Karhunen-Loeve transform, and similar methods. For example, "Visual Learning and Recognition of 3-D Objects from Appearance" by H. Murase and S. K. Nayer (International Journal of Computer Vision, 14, 1995), Japanese Laid-open Patent No. 8-271223, and Japanese Laid-open Patent No. 9-53915 are known.

A conventional object recognition apparatus is explained by referring to a drawing. In FIG. 22, a conventional object recognition apparatus comprises an image input unit 11 such as a camera for entering an image, a learning model memory unit 13 for preparing and storing local models of target object for recognitions from learning images, a feature extractor 12 for extracting the feature of an input image, a learning feature memory unit 14 for storing the feature (learning feature) of the model, a matching processor 15 for matching the feature of the input image with the feature of each model, and an object type estimator 16 for judging and issuing the type of the target object for recognition in the input image. Herein, the type refers to the individual or the kind.

The operation is described below. When an input image including a target object for recognition is entered in the feature extractor 12 through the image input unit 11, the feature extractor 12 extracts a feature from the input image, and issues the feature to the matching processor 15. The matching processor 15 sequentially searches the models from the learning model memory unit 13, and selects the learning feature from the learning feature memory unit 14. The similarity measure between the input image feature and the learning feature is calculated, and is issued to the object type estimator 16. Thus, the matching processor 15 repeats the procedure of similarity measure calculation and output by using the model of the learning model memory unit 13. When the similarity measure is the maximum, the object type estimator 16 determines to which type of models the target object for recognition included in the input image belongs.

The input image is overlapped with various learning images, and the overlapping degree is judged by using the similarity measure, and therefore the object equal to the learning image can be recognized, but when an object not being learned is included in the input image, it is difficult to estimate and recognize the object.

Or when recognizing the same object as the learning image, it was difficult to recognize if there is no information about the distance to the existing position of the object. To obtain the distance information by the imaging device only, a three-dimensional camera is needed, but the signal processing is complicated.

SUMMARY OF THE INVENTION

It is hence the object of the invention to present a method of recognizing an object accurately.

The object recognition method of the invention is an object recognition method comprising at least a learning step of learning a first entered image, and a recognition step of recognizing an entered second image, in which the learning step includes a step of entering the first image including the object to be learned, a step of dividing the entered image into a first partial image, a step of classifying the first partial image into plural classes, a step of calculating the feature extraction matrix in every classified class, a step of calculating a first feature by using the feature extraction matrix from the partial image classified in each class, and a step of storing the data of the first feature, and the recognition step includes a step of receiving a second image including the object to be recognized, a step of dividing the entered image into a second partial image, a step of calculating a second feature by using the feature extraction matrix from the second partial image, a step of calculating the similarity measure of the both by using the stored first feature data and second feature, a step of recognizing the object in the second image by using the similarity, and a step of issuing the result of recognition.

In this constitution, by setting a step of classifying the image to be learned in particular, the recognition method of this invention can recognize the object at high accuracy than in the prior art.

DETAILED, DESCRIPTION OF THE PREFERRED EMBODIMENTS

First Exemplary Embodiment

Figure 1:
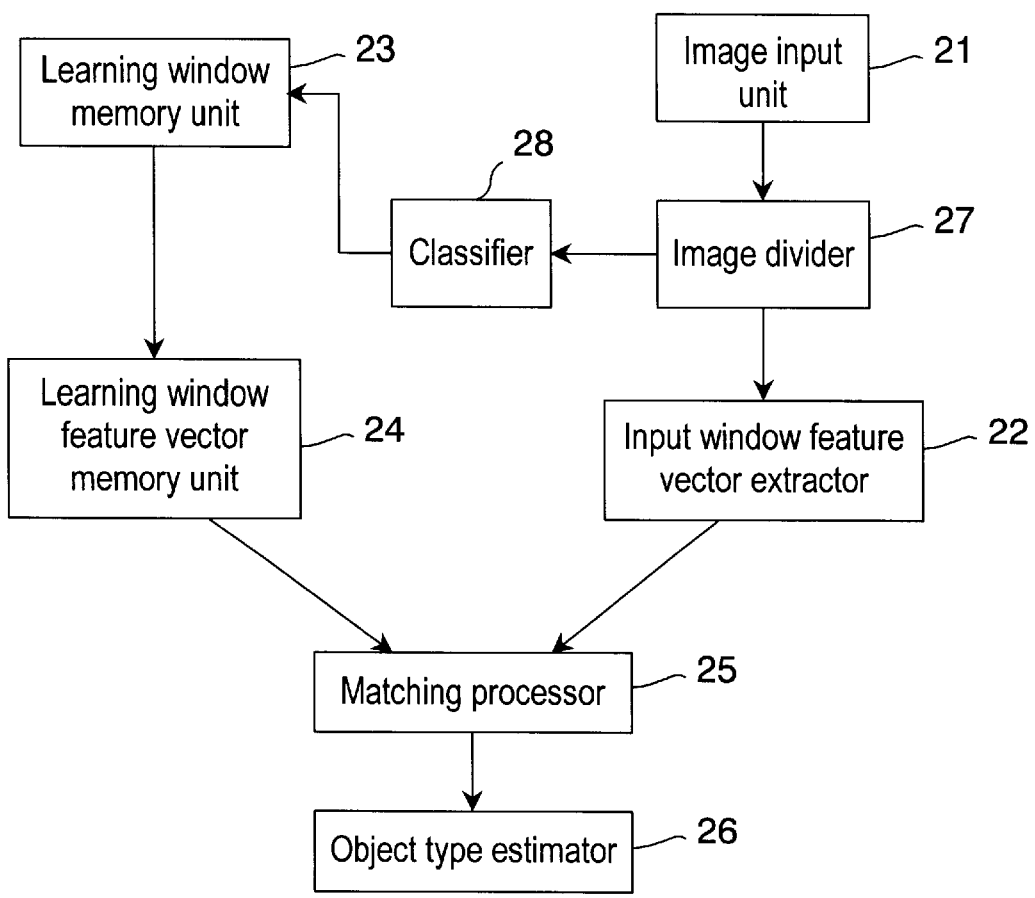
FIG. 1 is a structural diagram of an object recognition apparatus in embodiment 1 of the invention.

FIG. 1 is a structural diagram of an object recognition apparatus in embodiment 1 of the invention. Its operation is described below. An input image including a learning image is put into an image divider 27 through an image input unit 21. The image divider 27 cuts out a window and divides the image at each position of learning image, and sends to a classifier 28. The classifier classifies the window by the pair of object type and position, and multiple classified windows are stored as a set of learning. A learning window feature vector memory unit 24 calculates the within-class scatter from a set of learning windows classified in the same class, and calculates the between-class scatter from each set of learning windows, and using the discriminant analysis, the matrix is obtained from the scatter so that the within-class scatter may be small and that the between-class scatter may be large, and the feature vector is determined from the matrix and learning window, and the representative value of feature vector is determined and stored in every class.

The discriminant analysis is a method of evaluating the possibility of dividing into two classes when classifying, and it means the pattern classification method by extracting the feature by the classification criterion t that decreases the within-class scatter and increases the between-class scatter. For example, it is disclosed by R. A. Fisher in "The use of multiple measurements in taxonomic problems" (Ann. Eugenics, 7, Part II, pp. 174–188, 1936).

On the other hand, when an input image including a target object for recognition is entered in the image divider 27 through the image input unit 21, the image divider 27 cuts out the window and divides the image at each position of the input image, and issues an input window. A window feature vector extracting unit 22 extracts a feature vector of the input window, and issues to a matching processor 25.

The matching processor 25 searches learning windows sequentially from the learning window memory unit 23, and selects the feature vector of the window from the learning window feature vector memory unit 24. The similarity measure between the input window feature vector and the learning vector is calculated, and issued to the object type estimator 26. Thus, using the learning window of the learning window memory unit 23, the matching processor 25 repeats the procedure of similarity measure calculation and output. The object type estimator 26 estimates, when the similarity measure is maximum, the target object for recognition included in the input image to be located at which position and to belong to which type.

In the invention, the appearance of the target object for recognition in the image taken by the camera is determined by the relation between the object type and distance from the camera, it is designed to classify by the appearance. Therefore, without using a stereoscopic camera, from the image taken by a general single-lens camera, the object in the input image can be recognized, and the type and the position of the object can be estimated.

It is also possible to classify the learning window by the feature of the appearance of the object depending on the distance from the camera, that is, by the pair of object type and distance, and by the discriminant analysis, the feature of the learning window can be extracted so that the within-class scatter may be small while the between-class scatter may be maximum, and therefore the objet in the input image can be recognized even in the case of non-registered object, and the type and position of the object can be estimated.

Figure 2:
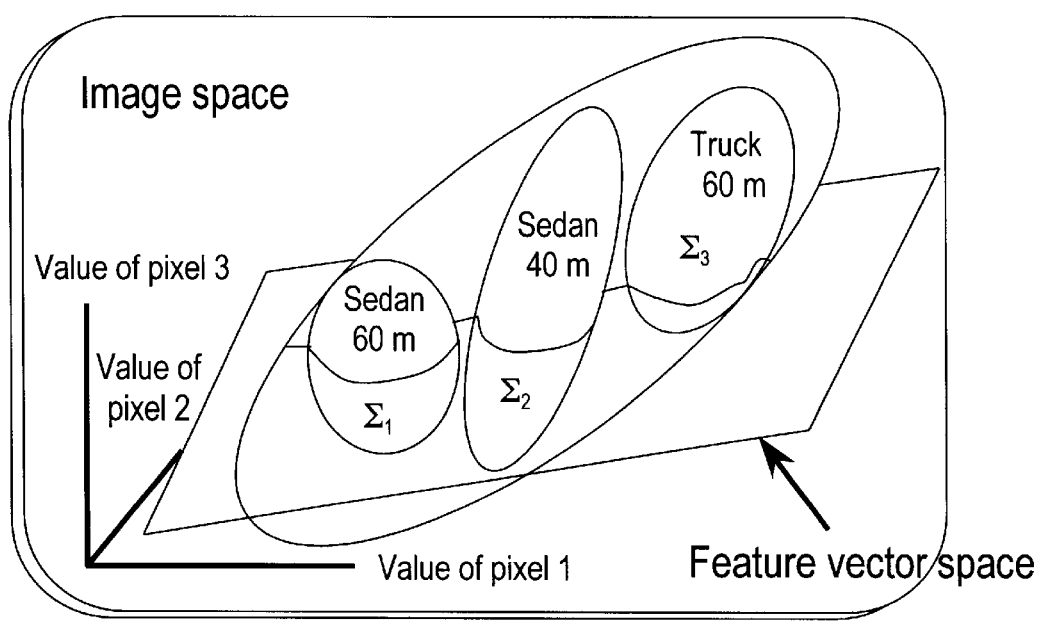
FIG. 2 is an example of applying discriminant analysis in classification of windows of vehicle image.

FIG. 2 shows an example of classification of vehicle images by discriminant analysis. For the sake of simplicity, a three-dimensional image space is set as the means of discriminating a vehicle composed of three pixels. The three axes of coordinates represent the Levels of pixels 1, 2 and 3. The difference in appearance except car type and position is regarded as a fluctuation within a class, and the difference in appearance due to difference in the car type and distance is emphasized, and the classes are distinguished. By setting a two-dimensional feature vector space in this three-dimensional image space, the difference in the class is discriminated. The feature vector space is a vector space convenient for discriminating process, and it is a kind of feature spaces.

The invention may be applied in a car-mount safe driving support system. By mounting a camera which takes images and the apparatus of the invention on a vehicle, the types of surrounding vehicles are discriminated, and the vehicle-to-vehicle distance can be estimated, so that approaching of which type of vehicle is warned to the driver. This is possible because the vehicle is classified by the car type and distance from the camera. For example, supposing the window being cut out from the input image to be classified as "sedan medium size, distance 20 m," it is known that a medium-size sedan is approaching in a distance of 20 m.

Figure 3:
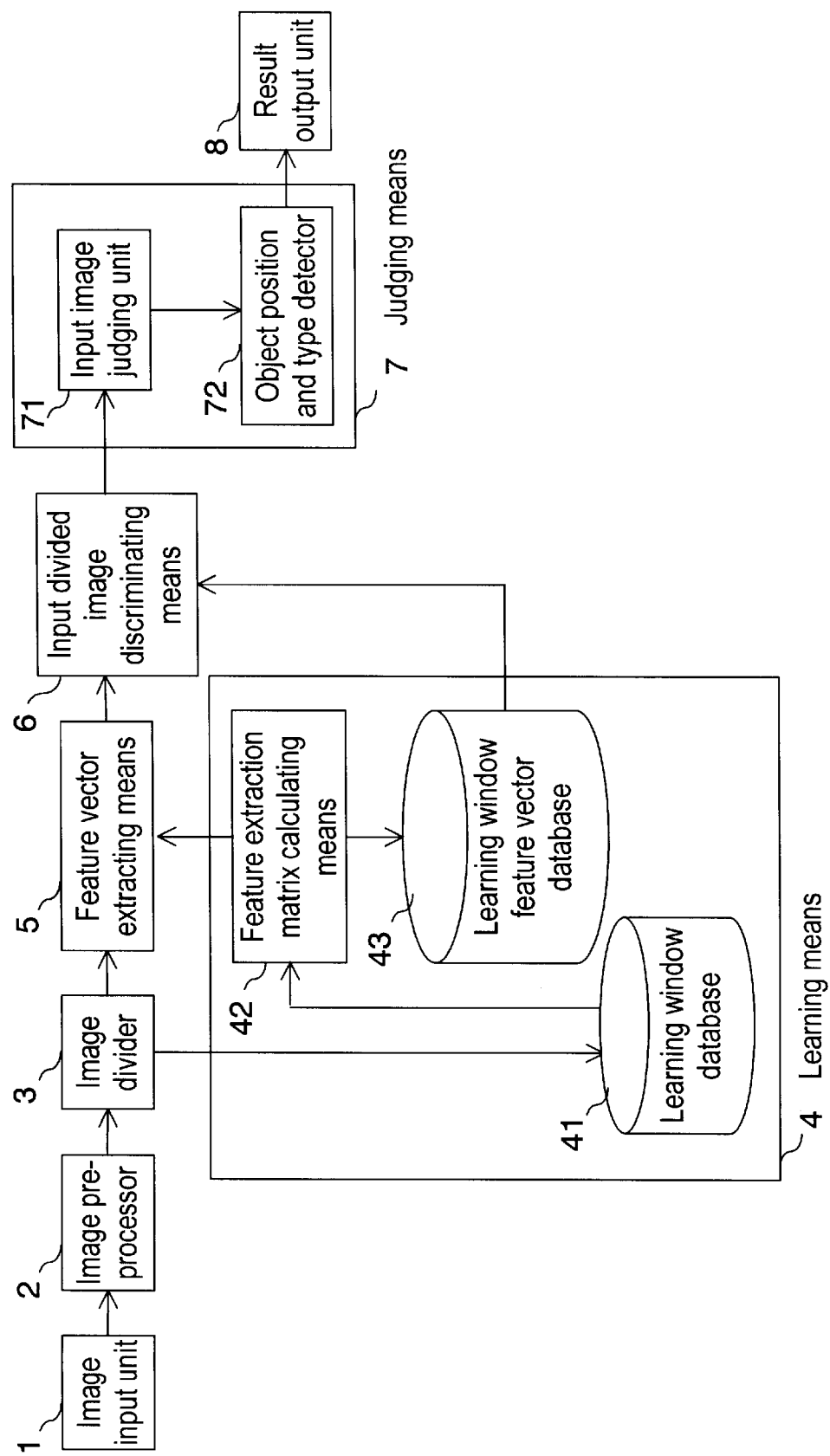
FIG. 3 is a detailed block diagram of an object recognition apparatus in embodiment 1 of the invention.

FIG. 3 is a more specific block diagram of the object recognition apparatus of FIG. 1. In FIG. 3, the invention comprises an image input unit 1 for receiving the image of the object to be recognized, an image pre-processor 2 for pre-processing the image entered from the image input unit 1 (processing for removing noise, etc.), an image divider 3 for dividing the image pre-processed by the image pre-processor 2 into windows and issuing, learning means 4 for preparing models of objects to be recognized, feature vector extracting means 5 for extracting a feature vector by using a matrix for feature extraction calculated in the learning means 4 in each input window divided in the image divider 3, input divided image discriminating means 6 for calculating the similarity measure by comparing the feature vector extracted in the feature vector extracting means 5 and the feature vector of a learning window feature vector database 43, judging means 7 for receiving the result of discrimination from the input divided image discriminating means 6 and estimating the position and type of the object in the input image, and a result output unit 8 for issuing the judging result. The learning means 4 includes a learning window database 41 for dividing the learning image including models of objects into windows of the same size as the windows prepared by the image divider 3, classifying by the pair of object position and type, and storing as learning windows, feature extraction matrix calculating means 42 for calculating a matrix for feature extraction from the learning windows stored in the learning window database 41 so as to be smallest in the within-class scatter and largest in the between-class scatter, and a learning window feature vector database 43 for storing the average of each class of the learning window feature vectors calculated by using the matrix for feature extraction. The judging means 7 includes an input image judging unit 71 for judging the input divided image and class of the highest value of the similarity measure entered from the input divided image discriminating means 6, and an object position and type detector 72 for judging the position and type of the object of the class selected by the input image judging unit 71 to be the position and type of the object of the input image.

Figure 4:
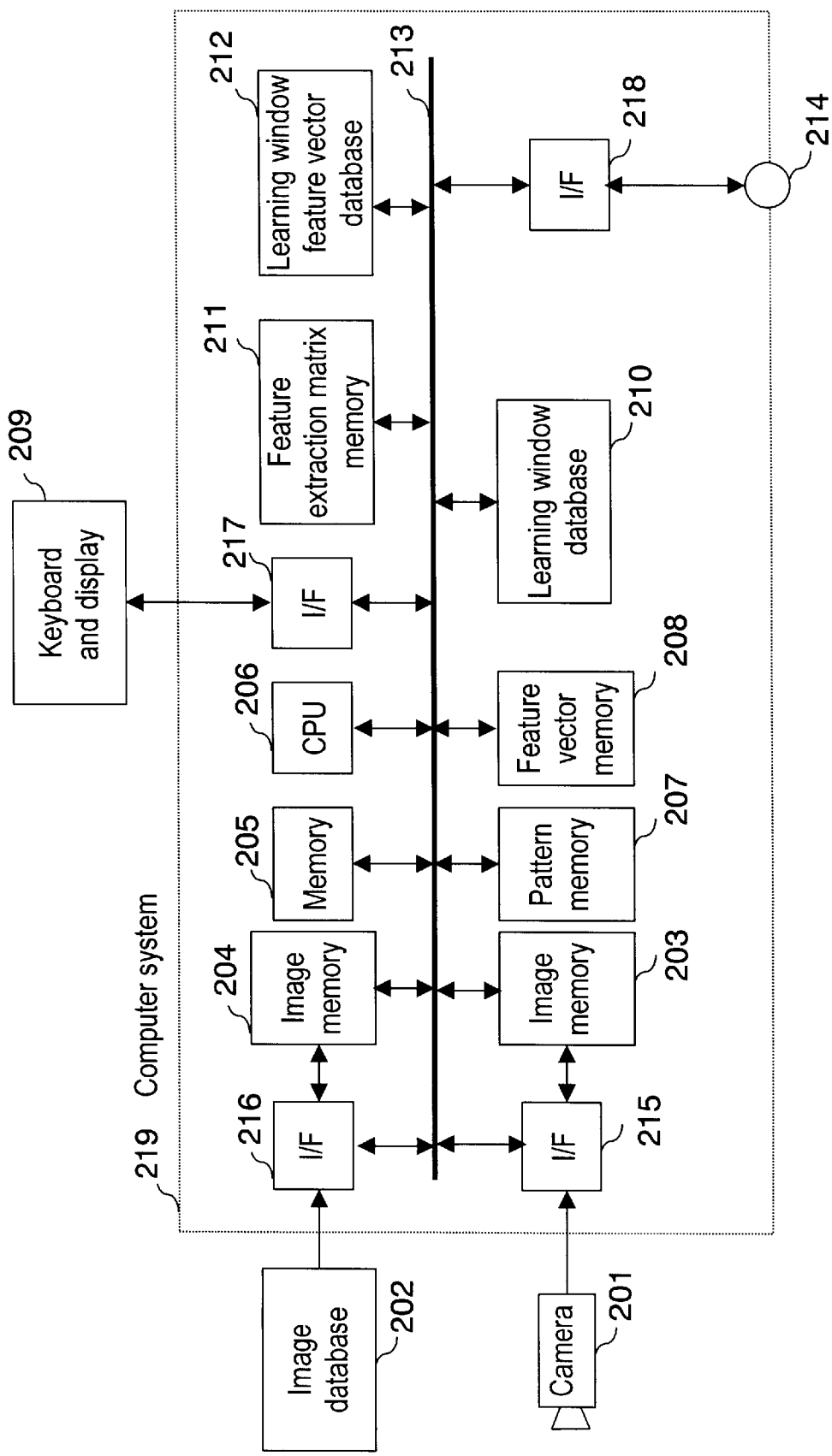
FIG. 4 is a structural diagram of a computerized object recognition system of embodiment 1 of the invention.

This embodiment 1 may be also realized in a computerized object recognition system as shown in FIG. 4.

In FIG. 4, a computerized object recognition system comprises a video camera 201 for taking the image of an object, an image database (secondary memory device such as magneto-optical disk) 202 for storing large-scale image information, a keyboard and display 209, and a computer system 219. The computer system 219 includes image memories 203, 204 for storing output images of the video camera 201 and image database 202, a memory 205 for program storage and work, a CPU 206, a pattern memory 207 for storing image patterns, a feature vector memory 208 for storing feature vectors calculated by execution of feature extraction, a learning window database 210 for dividing the learning images including models of various objects into windows and storing as learning windows, a feature extraction matrix memory 211, a learning window feature vector database 212 for storing feature vectors of learning windows, a CPU bus 213, an output terminal 214 for issuing the obtained recognition result, and interface units (I/F units) 215–218.

Herein, the class is divided by various items expressing the objects, such as the kind, shape, size, position, and color, and refers to a hierarchical structure classified in major or minor categories.

The window is a partial image obtained by cutting out a target object for recognition from the image in a specific size as described later, and the cut section is supposed to be rectangular in the following description, but the shape is not particularly defined. The configuration of windows may be continuous, discontinuous, overlapped, etc. Further, one or plural windows may be extracted from the image, and it may be selected freely depending on each image. The position and shape in the image expressed by the coordinates of the windows must be defined prior to calculation.

The feature may be expressed in various methods, and it is expressed by the concept of the feature vector in the following explanation.

The object recognition apparatus and the system being thus constituted are intended to recognize the pair of position and type of the object is most similar to which one of the classes registered in the learning window database. The entire processing is divided into the learning process, that is, the process of calculation of matrix for feature extraction and construction of learning window database, and the recognition process, that is, the process of judging the class from the feature vector of the most similar learning window feature vector database of the input image. Usually, since real-time operation is required in the recognition process, the former is off-line process and the latter is on-line process.

Figure 5:
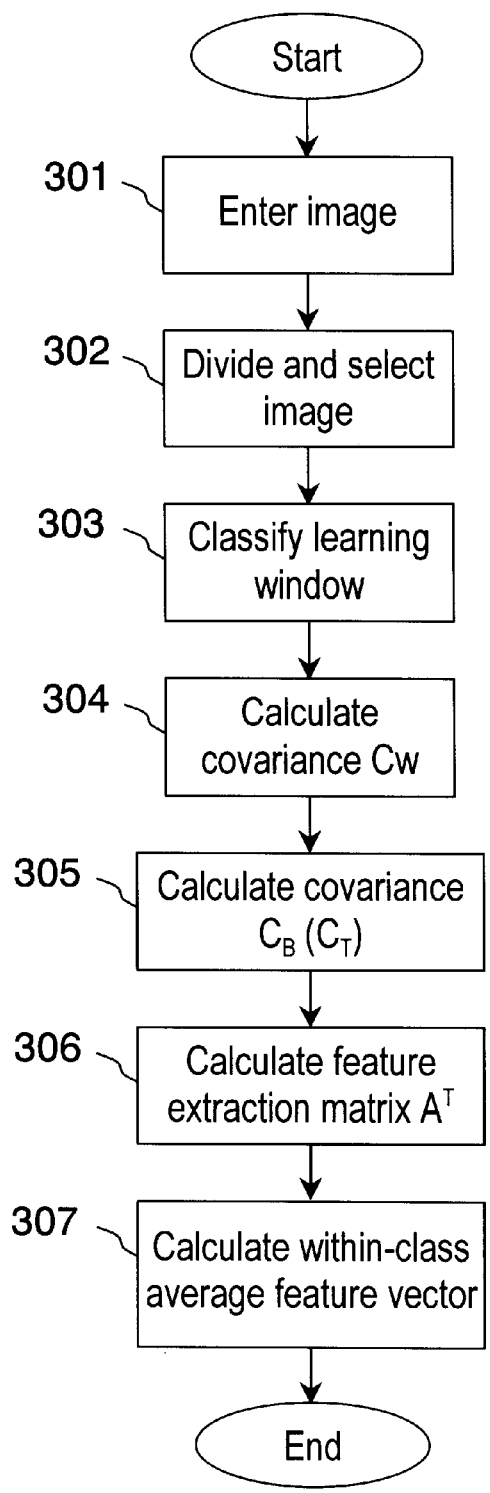
FIG. 5 is a flowchart showing the flow of off-line processing in embodiment 1 of the invention.

First, the off-line process is described while referring to FIG. 4 and FIG. 5. FIG. 5 is a flowchart showing the flow of off-line processing. The purpose of off-line processing is to calculate the matrix for feature extraction and build up the learning window database as mentioned above.

The image signal of the object obtained from the video camera 201 is digitally converted through the I/F 215 and accumulated in the image memory 203. The object image taken out from the image database 202 is accumulated in the image memory 204 (301).

One or plural windows cutting out the object portion of the image once stored in the image memory 204 as learning image in a specific size are selected (302). The windows are numbered according to the position occupied by a part of the object. The learning windows obtained from each learning image are classified by the object position and type (303). The type also includes the window number. Multiple learning windows divided into classes are converted into a pattern of one-dimensional data row, for example, as a set of learning windows, and held in the pattern memory 207 as the set of pattern in each class.

The matrix for feature extraction is calculated in the following procedure according to the concept of Fisher discriminant function.

From each set of patterns classified in a same class, the within-class covariance matrix $C_W$ is calculated in each class according to formula 1 (304).

$$C_w = \sum_{i=1}^{K} \omega_i C_i \quad \text{[formula 1]}$$

$$x_i = \frac{1}{n-i} \sum_{\text{class } i} x$$

$$C_i = \frac{1}{n_i} \sum_{\text{class } i} (x - \bar{x}_i)(x - \bar{x}_i)^T$$

$$\omega_i = Pr(\text{class } i) > 0, \sum_{i=1}^{K} \omega_i = 1$$

$x$: pattern vector $n_i$: sample number of class $i$ $K$: class number

The between class covariance matrix $C_B$ is calculated according to formula 2 from each set of patterns.

$$C_B = \sum_{i=1}^{K} \omega_i (\bar{x}_i - \bar{x}_T)(\bar{x}_i - \bar{x}_T)^T \quad \text{[formula 2]}$$

$$\bar{x}_T = \sum_{i=1}^{K} \omega_i \bar{x}_i$$

(average vector of the total classes)

The total class covariance matrix $C_T$ is calculated according to formula 3 (305).

$$C_W + C_B = C_T \quad \text{[formula 3]}$$

Herein, as the criterion of discrimination, the transform (a) is determined to maximize the Fisher ratio (formula 4) so as to be largest in the between-class scatter and smallest in the within-class scatter.

$$J(a) = \frac{a^T C_B a}{a^T C_W a} \quad \text{[formula 4]}$$

This is equivalent to solution of eigenvalue problem (formula 5), and the obtained matrix for feature extraction $A^T$ is stored in the feature extraction matrix memory 211 (306).

$$C_B A = C_W A \Lambda \quad \text{[formula 5]}$$

Λ: eigenvalue matrix diag $(\lambda_1, \ldots, \lambda_N > 0)$
A: proper vector matrix $[a_1, \ldots, a_N]$ The learning window used in learning is registered in the learning window database. The representative value of each class of each learning window feature vector calculated by using the matrix for feature extraction, for example, the average value is determined and registered in the learning window vector database (307).

Figure 6:
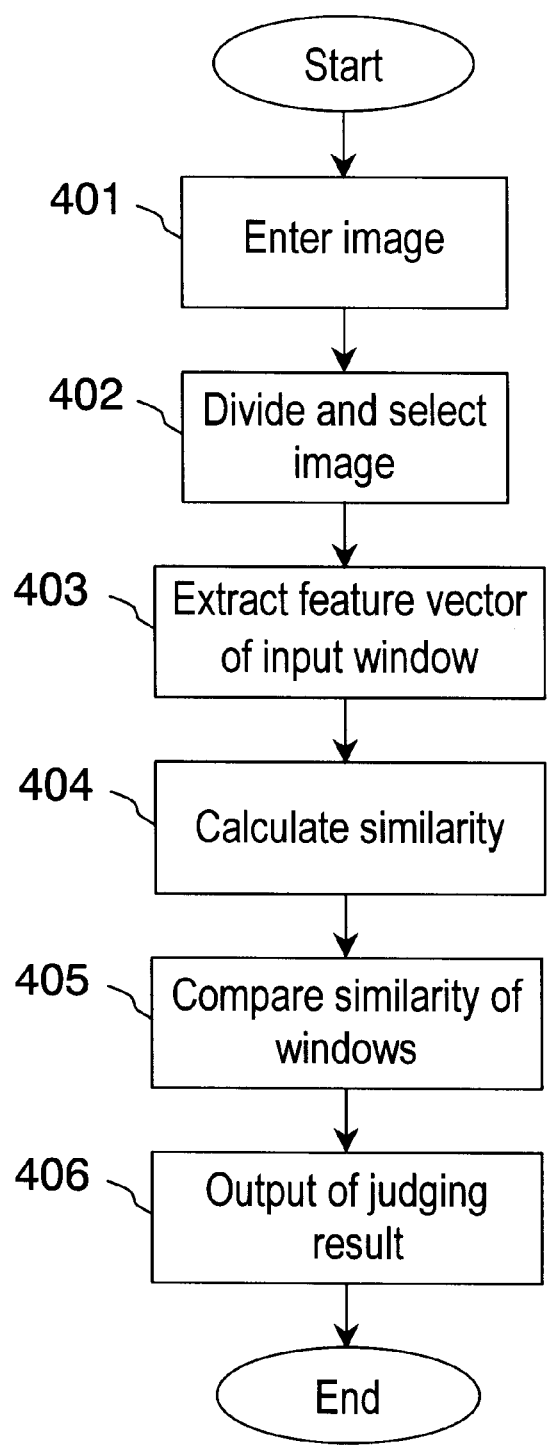
FIG. 6 is a flowchart showing the flow of on-line processing in embodiment 1 of the invention.

The on-line processing is explained next by reference to FIG. 4 and FIG. 6. FIG. 6 is a flowchart showing the flow of on-line processing.

The purpose of on-line processing is to calculate the similarity measure to the image of the selected class from the input divided image and registered learning window database, and to determine the maximum value of the similarity measure. The image of the target object for recognition is entered from the video camera 201, and stored in the image memory 203 (401). The image divider 3 sequentially extracts windows of a specific size from the input images stored in the image memory 203, and accumulates in the pattern memory 207 as input windows together with coordinates of the center point of the window (402).

Using the feature extraction matrix $A^T$ obtained in the off-line operation, the feature vector (fa) of the input window is calculated in accordance with formula 6, and accumulated in the feature vector memory 208 (403).

$$fa = A^T a \quad \text{[formula 6]}$$

(product of feature extraction matrix $A^T$ and vector a)

$$\text{Euclidean distance in a feature space} = \sqrt{(fs - fa)^2} \quad \text{[formula 7]}$$

fs: vector in the learning window feature vector database
fa: feature vector of the input window $$= \frac{fa \cdot fs}{|fa||fs|} \quad \text{[formula 8]}$$

Next is explained the optimum matching process, in which the distance between two feature vectors (for example, Euclidean distance) or similarity measure is calculated in formula 7 and formula 8, from the feature vector (fs) selected from the learning window feature vector database 212 similar to the feature vector (fa) of the input window. The Euclidean distance is judged as the smallest class from formula 7, or the class of the highest similarity measure is judged as the recognition result from formula 8 (404). The similarity measure of each window is compared (405). For the input image, one or more judging results are issued to the output terminal 214 through the I/F unit 218 together with the coordinates of the corresponding input window (406).

Figure 7:
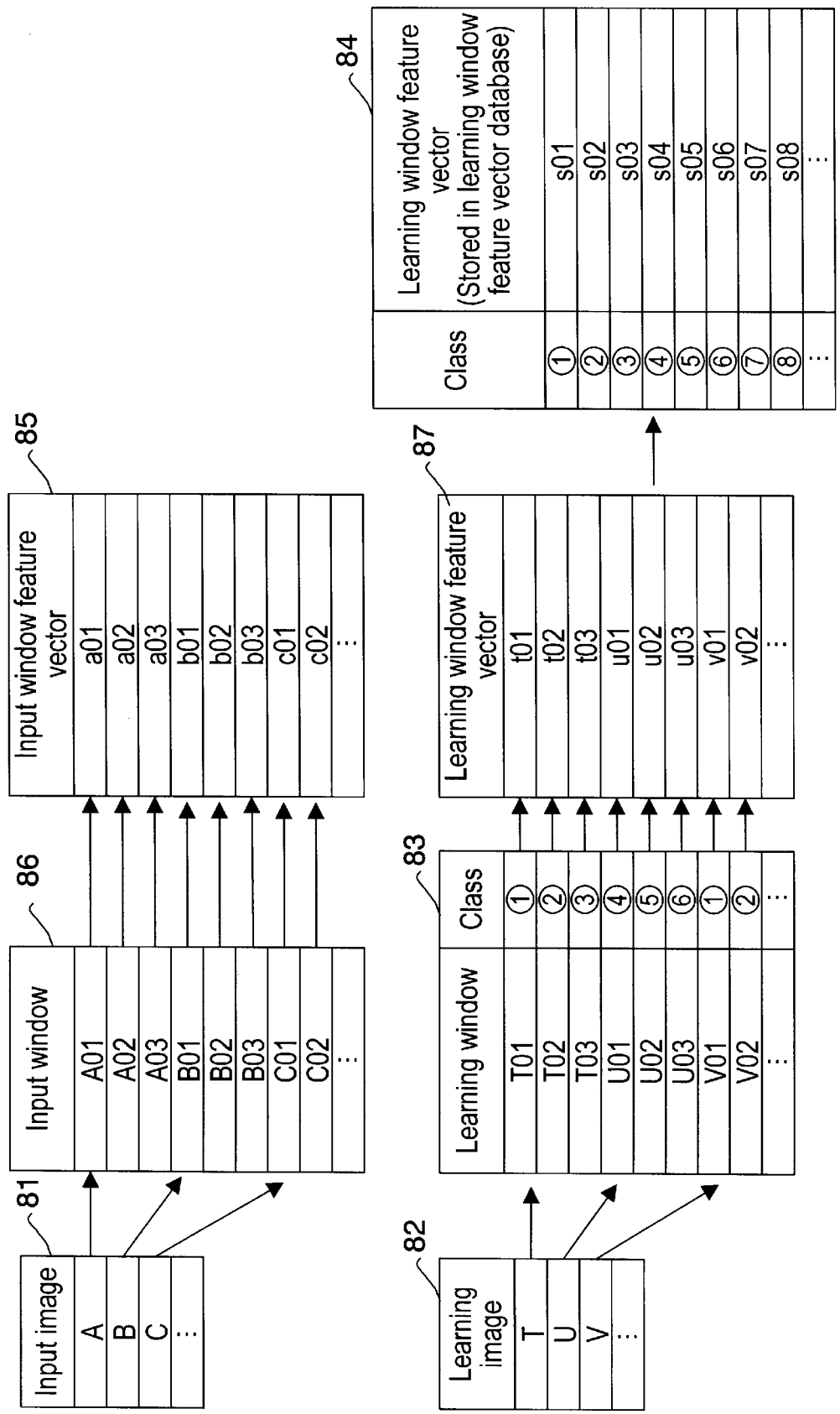
FIG. 7 is a diagram explaining mutual relation of input and learning images, window, and feature vector.

FIG. 7 shows an example of mutual relation of input and learning images, windows and feature vectors, and the operation of off-line processing and on-line processing. In FIG. 7, for example, input windows 86 A01, A02, A03, . . . are created from A of input image 81, and input window feature vectors 85 a01, a02, a03, . . . are created from each input window 86. On the other hand, from T of learning image 82, learning windows 83 are created and classified, learning window feature vectors 87 t01, t02, t03, . . . are determined, and further the matrix for feature extraction is obtained. From the learning window feature vectors t01, t02, t03, . . . , representative learning window feature vectors of class 84 s01, s02, s03, . . . are created and registered.

Second Exemplary Embodiment

Embodiment 2 is similar to embodiment 1 except that the region for cutting out windows from the input image is limited so as to shorten the processing time for searching the target object for recognition. The difference from embodiment 1 is that region limiting means for limiting the region from the image entered through the image input unit 1 is added. Same parts as in embodiment 1 are identified with same reference numerals, and duplicate description is omitted.

Figure 8:
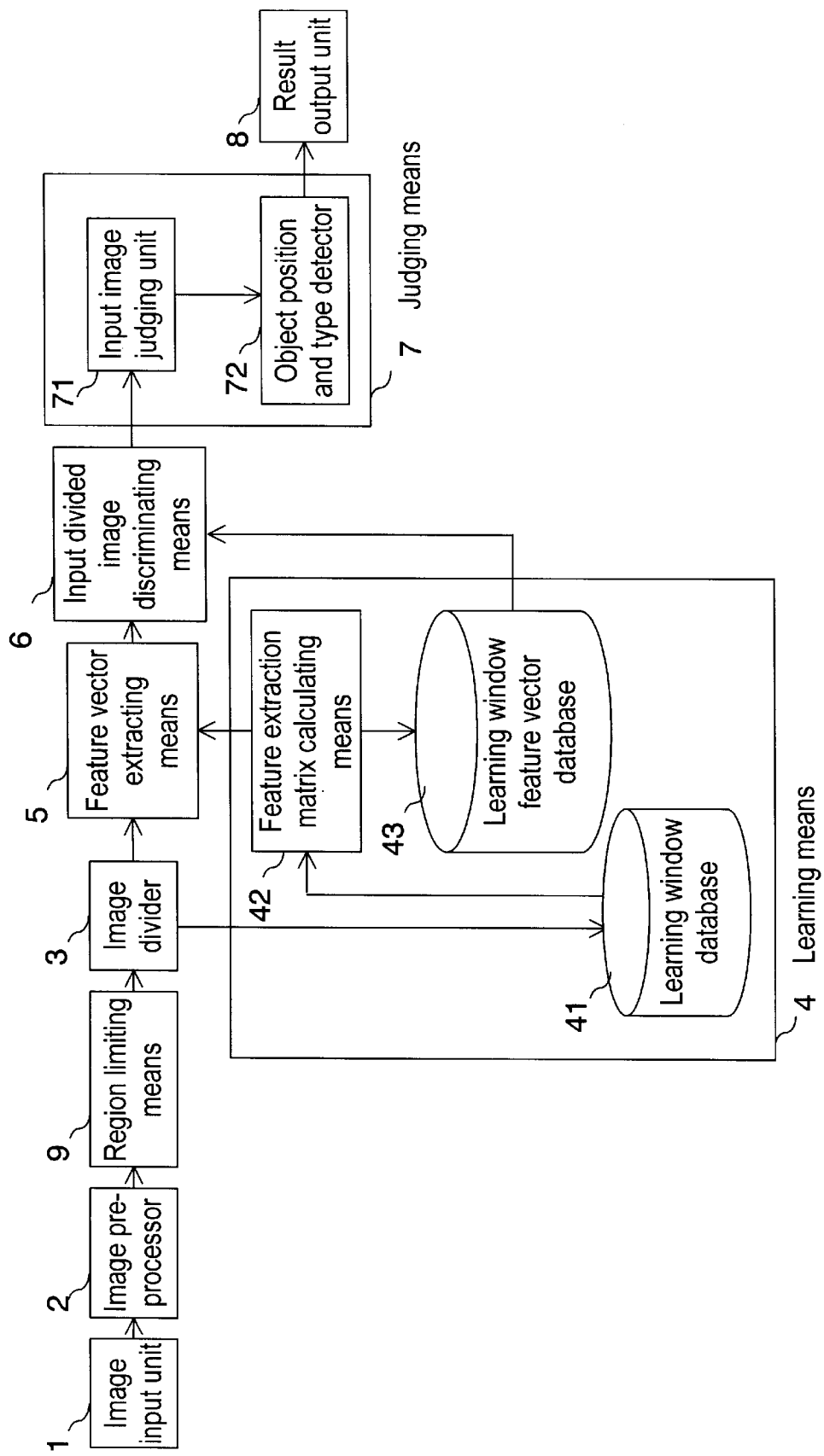
FIG. 8 is a block diagram of an object recognition apparatus in embodiment 2 of the invention.

FIG. 8 is a block diagram of an object recognition apparatus in embodiment 2 of the invention. Referring to FIG. 8, the difference from embodiment 1 in FIG. 3 is explained below. In FIG. 8, by adding region limiting means 9 to the constitution in FIG. 3, it is intended to limit the region of searching the object within the input image. For example, when recognizing a vehicle (object) in a road image (input image), the vehicle can be found by limiting only to the road region in the input image. Whether located by the road side or mounted on the car, as far as the camera is fixed, the road region in the input image is easily determined, and hence the region can be limited easily.

As a result, the processing time for searching the object is shortened, and wrong recognition can be avoided by excluding the region known to be free from object.

Third Exemplary Embodiment

Figure 9:
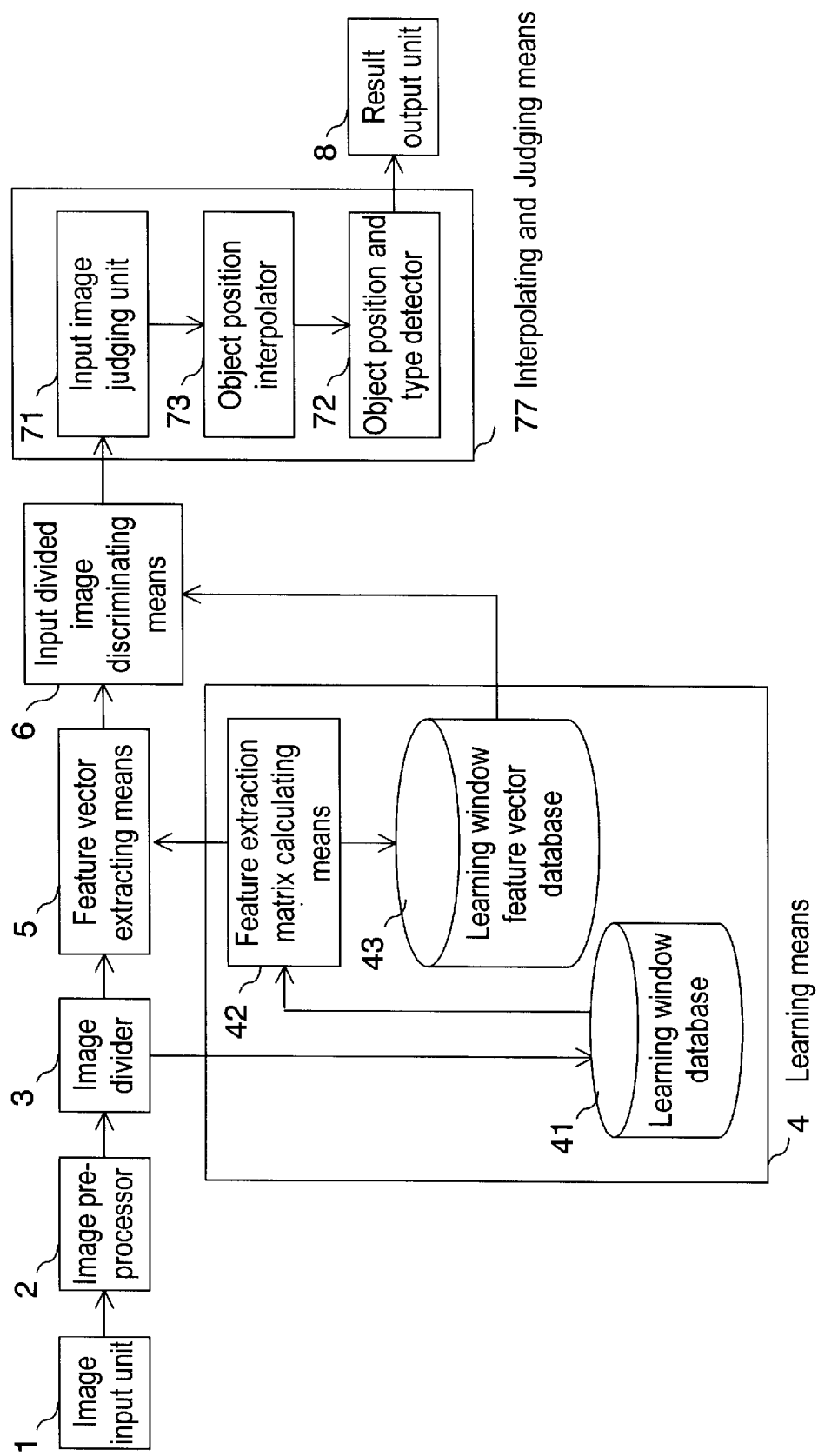
FIG. 9 is a block diagram of discriminating means in embodiment 3 of the invention.

Embodiment 3 is similar to embodiment 1 except that the class is specified by the pair of the distance along the object existing route and the type. The difference from embodiment 1 is that an object position interpolator is added to the judging means 7 in FIG. 3. Judging means 77 in this embodiment is shown in FIG. 9. Referring to FIG. 9, the difference from the function of the judging means 7 in embodiment 1 in FIG. 3 is explained below. The judging means 77 is intended to estimate the position and type of the object in the input image by receiving the result of discrimination from the input divided image discriminating means 6, and it comprises an input image judging unit 71 for judging the input divided image and class of the highest value of the similarity measures entered from the input divided image discriminating means 6, an object position interpolator 73 for interpolating the distance between classes from the coordinates in the feature vector space (vector space convenient for distinguishing), and an object position and type detector 72 for estimating the object of the type of the class selected by the input image judging unit 71 and estimating the distance along the object route simultaneously.

For example, in the case of 50 m and 70 m classes, it is intended to interpolate and estimate 60 m and 65 m, intermediate distances between 50 m and 70 m, also by using the feature vector space coordinates.

The operation is described below, but the off-line processing is omitted because it is same as in embodiment 2.

Figure 10:
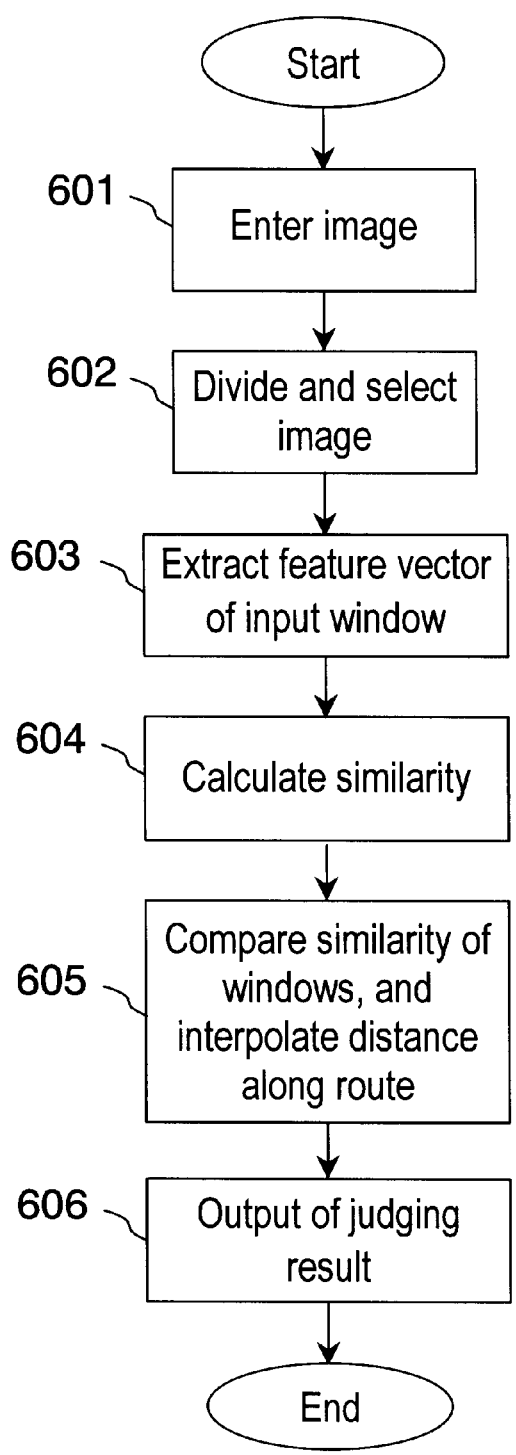
FIG. 10 is a flowchart showing flow of off-line processing in embodiment 3 of the invention.

The on-line processing is explained by referring to FIG. 10 which is a flowchart showing the flow of on-line processing. The difference from FIG. 6 is the operation at step 605 in FIG. 10. Different points are mainly described below.

Of the feature vectors accumulated in the learning window feature vector database, classes of same type and different distance can be displayed on the feature vector space. When the feature vector of the input window is similar to a value between feature vectors of this learning window feature vector database, the object position interpolator can interpolate the distance to this object. For example, the interval of feature vectors between distance 50 m and 70 m classes is equally divided, and the distances of 55 m, 60 m, and 65 m are interpolated, and the most similar distance of the feature vector of input window is judged, and the distance along the object existing route and the type are judged. Consequently, the similarity measure of each window is compared (605). The other parts are same as in embodiment 1.

Fourth Exemplary Embodiment

In embodiment 4, unlike embodiments 1 to 3, as the information for recognizing the object, not only one kind of information obtained from one input means relating to the object is used, but plural kinds of information are used. Plural kinds of information are, for example, images obtained from plural input means (visible ray camera, infrared camera, CT scanner, 3-D camera, etc.), or different types of information obtained from one input means, such as contrast information of image data, color information, edge information, and three-dimensional information.

In this embodiment, using the integrated information vector in which plural kinds of information are integrated according to a uniform rule, it is intended to cope with numerous variations of object type. The information for composing the integrated information vector is explained below as information vector.

Figure 11:
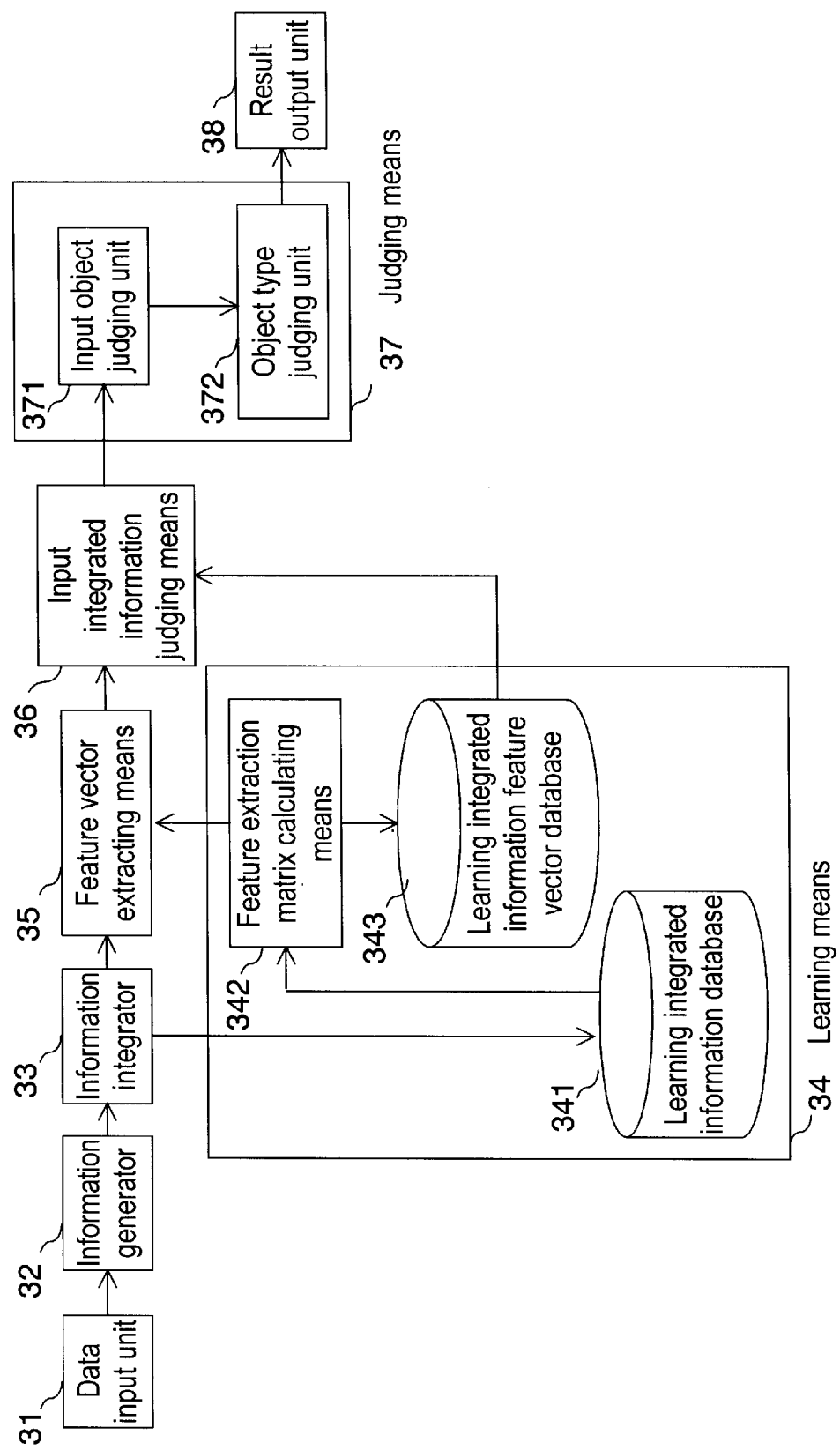
FIG. 11 is a block diagram of an object recognition apparatus in embodiment 4 of the invention.

FIG. 11 is a block diagram of an object recognition apparatus of embodiment 4 of the invention. In FIG. 11, the embodiment comprises a data input unit 31 for receiving image data of the object to be recognized, an information generator 32 for taking out information of a part from the image entered through the data input unit 31, generating a one-dimensional vector, and converting the image part into edge information, and generating a one-dimensional vector, an information integrator 33 for merely coupling each information generated in the information generator 32, learning means 34 for preparing models of objects to be recognized, feature vector extracting means 35 for extracting a feature vector by using a matrix for feature extraction calculated in the learning means 34 in each input data of image divided by the information integrator 33, input integrated information discriminating means 36 for calculating the similarity measure by comparing the feature vector extracted by the feature vector extracting means 35 and the feature vector in a learning integrated information feature vector database 43, judging means 37 for estimating the type of the object in the input image by receiving the result of discrimination from the input integrated information discriminating means 36, and a result output unit 38 for issuing the judging result.

The learning means 34 includes a learning integrated information database 341 for classifying the learning images including models of objects by the class of objects and storing as learning integrated information, feature extraction matrix calculating means 342 for calculating a matrix for feature extraction from the learning integrated information vectors stored in the learning integrated information database so as to be smallest in the within-class scatter and largest in the between-class scatter, and a learning integrated information feature vector database 343 for storing the representative value of each class, for example, the average of the learning integrated information feature vector for calculating by using the matrix for feature extraction obtained in the feature extraction matrix calculating means 342.

The judging means 37 includes an input object judging unit 371 for selecting the input integrated information and class of the highest value of similarity measure among the inputs from the input integrated information discriminating means 36, and an object type judging unit 372 for judging the type of the object of the class selected by the input object judging unit 371 is the type of the input object.

Figure 12:
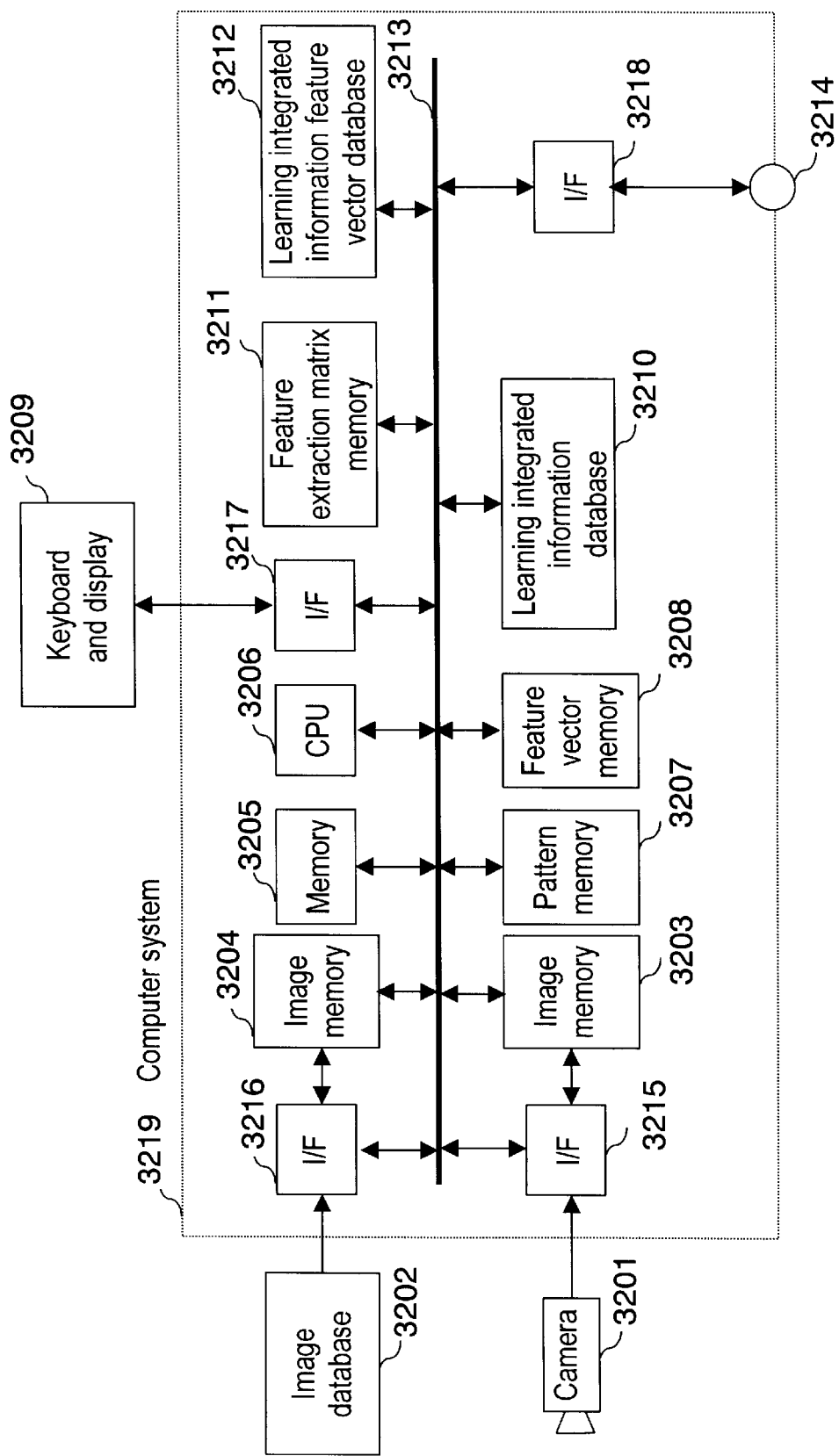
FIG. 12 is a structural diagram of a computerized object recognition system of embodiment 4 of the invention.

FIG. 12 is a block diagram of a computerized object recognition system of embodiment 4 of the invention.

In FIG. 12, a computerized object recognition system comprises a video camera 3201 for taking the image of an object, an image database (secondary memory device such as magneto-optical disk) 3202 for storing large-scale image information, a keyboard and display 3209, and a computer system 3219.

The computer system 3219 includes image memories 3203, 3204 for storing output images of the video camera 3201 and image database 3202, a memory 3205 for program storage and work, a CPU 3206, a pattern memory 3207 for storing image patterns, a feature vector memory 3208 for storing feature vectors calculated by execution of feature extraction, a learning integrated information database 3210 for storing learning integrated information generated from learning images including models of various objects, a feature extraction matrix memory 3211, a learning integrated information feature vector database 3212 for storing feature vectors of learning windows, a CPU bus 3213, an output terminal 3214 for issuing the obtained recognition result, and I/F units 3215–3218.

The object recognition apparatus and system being thus constituted are intended to recognize that the type of the object is most similar to which one of the classes registered in the learning integrated information database. The recognition process consists of an off-line processing of calculating the matrix for feature extraction and building up the learning integrated information database, and an on-line processing of judging the class from the feature vector of the learning integrated information feature vector database most similar to the input image.

Figure 13:
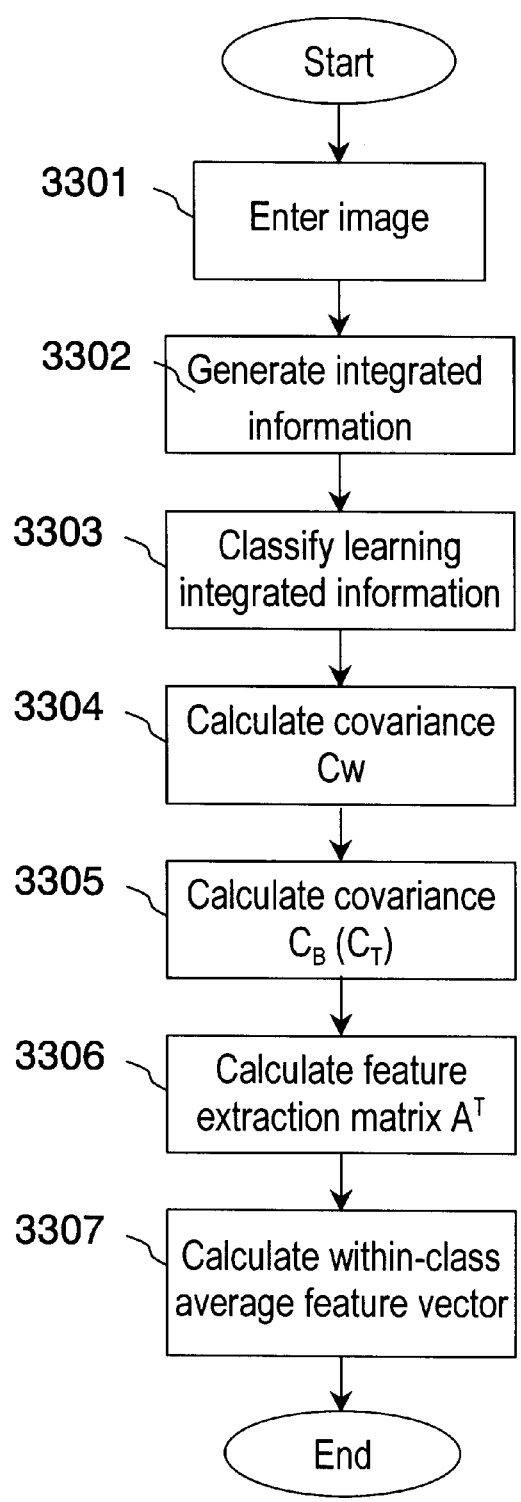
FIG. 13 is a flowchart showing the flow of off-line processing in embodiment 4 of the invention.

First, the off-line processing is described by referring to FIG. 12 and FIG. 13. FIG. 13 is a flowchart showing the flow of off-line processing. The purpose of off-line processing is to calculate the matrix for feature extraction and build up the learning integrated information database.

First, the image signal of the object obtained from the video camera 3201 is digitally converted through the I/F 3215 and accumulated in the image memory 3203. The object image taken out from the image database 202 is accumulated in the image memory 3204 (3301).

The learning input image taken out from the object part in the image once accumulated in the image memory 3203 as learning input image is converted into learning edge image, and the learning input image and learning edge image are integrated as information of different properties, and learning integrated information is generated (3302).

As the information to be integrated, part of the learning input image is expressed as the pattern of one-dimensional data row, which is optical information 1, and part of the same image is converted into learning edge image, and expressed as a pattern of one-dimensional data row, which is geometrical information 2. Herein, for the simplicity of explanation, two one-dimensional data rows 1 and 2 are merely coupled, and a one-dimensional pattern is generated as learning integrated information.

Actually, aside from coupling two one-dimensional data rows, the number of elements may be combined, weighted and added, or multiplied. Two or more patterns that can be operated may be freely operated. A number is given to a mark such as position showing the part of the object. The image pattern includes information vector of contrast image and edge image, and integrated information vector.

Figure 14:
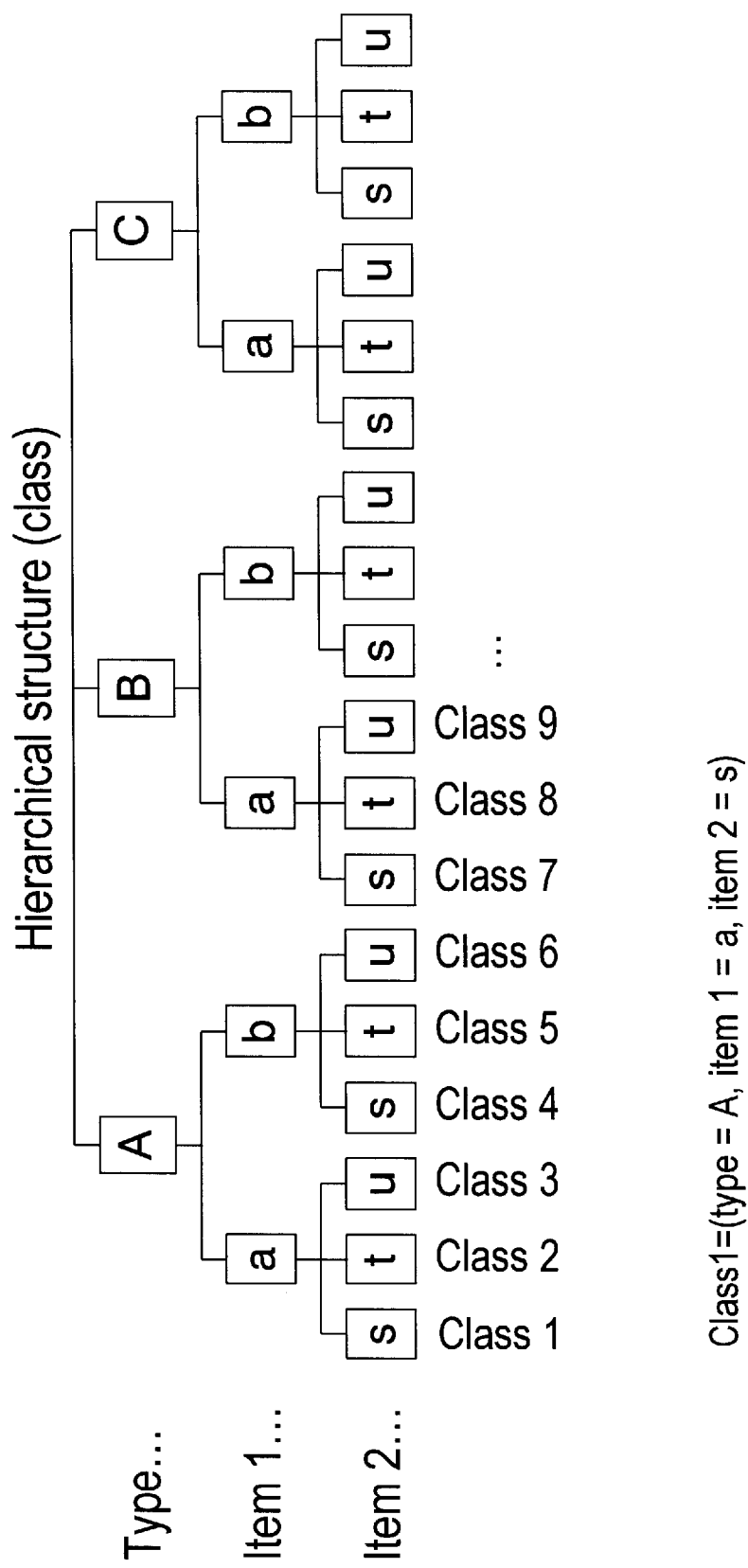
FIG. 14 is an explanatory diagram showing an example of classification method in embodiment 4 of the invention.

The learning integrated information obtained from these learning input images is classified. The class includes the number of integrated information. A set of multiple pieces of learning integrated information held in the pattern memory 3207 in every class (3303). Herein, the information is classified into types expressing the objects such as the kind and size. Not limited to the type to be estimated, it may be also classified into a more specific hierarchical structure by position or color. An example of classification is shown in FIG. 14.

The matrix for feature extraction is calculated in the following procedure according to the concept of Fisher discriminant function as mentioned above. In operation, formula 1 to formula 8 are used, same as in embodiment 1, and hence it is omitted here.

From each set of patterns classified in a same class, the within-class covariance matrix $C_W$ is calculated in each class according to formula 1 (3304).

The between-class covariance matrix $C_B$ is calculated according to formula 2 from each set of patterns (3305).

The total class covariance matrix $C_T$ is calculated according to formula 3.

Herein, conforming to the discriminant analysis method, as the criterion of discrimination, the transform (a) is determined to maximize the Fisher ratio (formula 4) so as to be largest in the between-class scatter and smallest in the within-class scatter.

Figure 15:
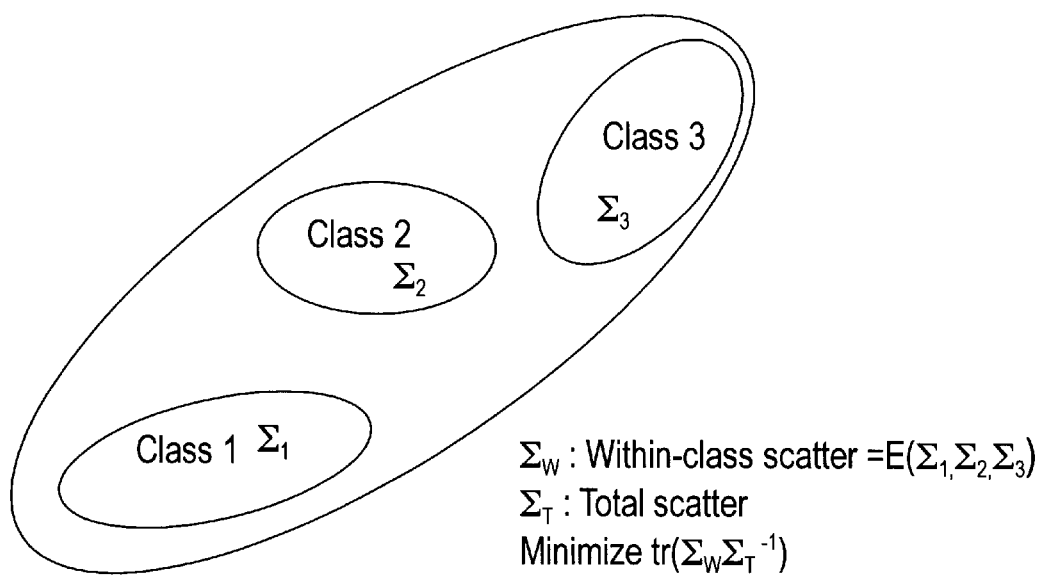
FIG. 15 is an explanatory diagram showing an example of discriminant analysis method in embodiment 4 of the invention.

A concept of discriminant analysis in the case of three classes is shown in FIG. 15.

This is equivalent to solution of eigenvalue problem (formula 5), and the obtained matrix for feature extraction $A^T$ is stored in the feature extraction matrix memory 3211 (3306).

The learning integrated information used in learning is registered in the learning integrated information database. The representative value of each class of each learning integrated information feature vector calculated by using the matrix for feature extraction, for example, the average value is registered as feature vector in the learning integrated information vector database (3307).

Figure 16:
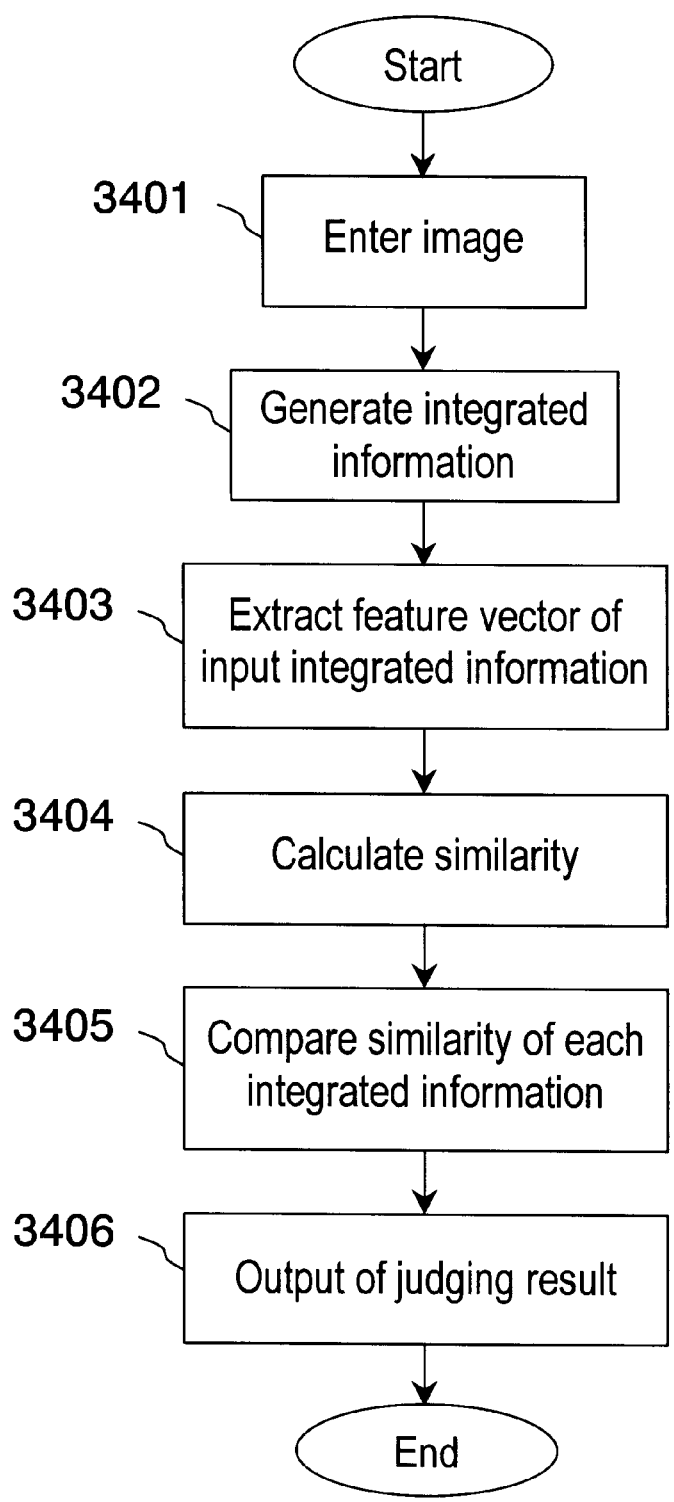
FIG. 16 is a flowchart showing the flow of on-line processing in embodiment 4 of the invention.

The on-line processing is explained next by reference to FIG. 12 and FIG. 16. FIG. 16 is a flowchart showing the flow of on-line processing. The purpose of on-line processing is to calculate the similarity measure to the image of the selected class from the input image and registered learning integrated information database, and to determine the maximum value of the similarity measure.

The image data of the target object for recognition is entered from the video camera 3201, and stored in the image memory 3203 (3401).

The input image from the image memory 3203 is converted into edge information, and the one-dimensional data row of input image and one-dimensional data row of edge image are integrated, and obtained as input integrated information pattern, which is accumulated in the pattern memory 3207 together with the mark of integrated information, for example, coordinates of the center point of the input image part of the information herein (3402).

Using the feature extraction matrix $A^T$ from the feature extraction matrix memory 311 obtained in the off-line operation, the feature vector (fa) of the input integrated information vector is calculated according to formula 6, and accumulated in the feature vector memory 3208 (3403).

Next is explained the optimum matching process, in which the similarity measure is calculated in formula 7 from the input integrated information feature vector (fa) and each feature vector (fs) selected from the learning integrated information feature vector database 3212 (3404). Herein, the similarity measure is the highest in the class of the minimum Euclidean distance.

The calculated similarity measures are compared, and the class of the highest similarity measure is judged as the result of recognition (3405). The judging result of one type or more from the class judged for the input image is issued to the output terminal 3214 through the I/F unit together with the coordinates of the corresponding input integrated information (3406).

Figure 17:
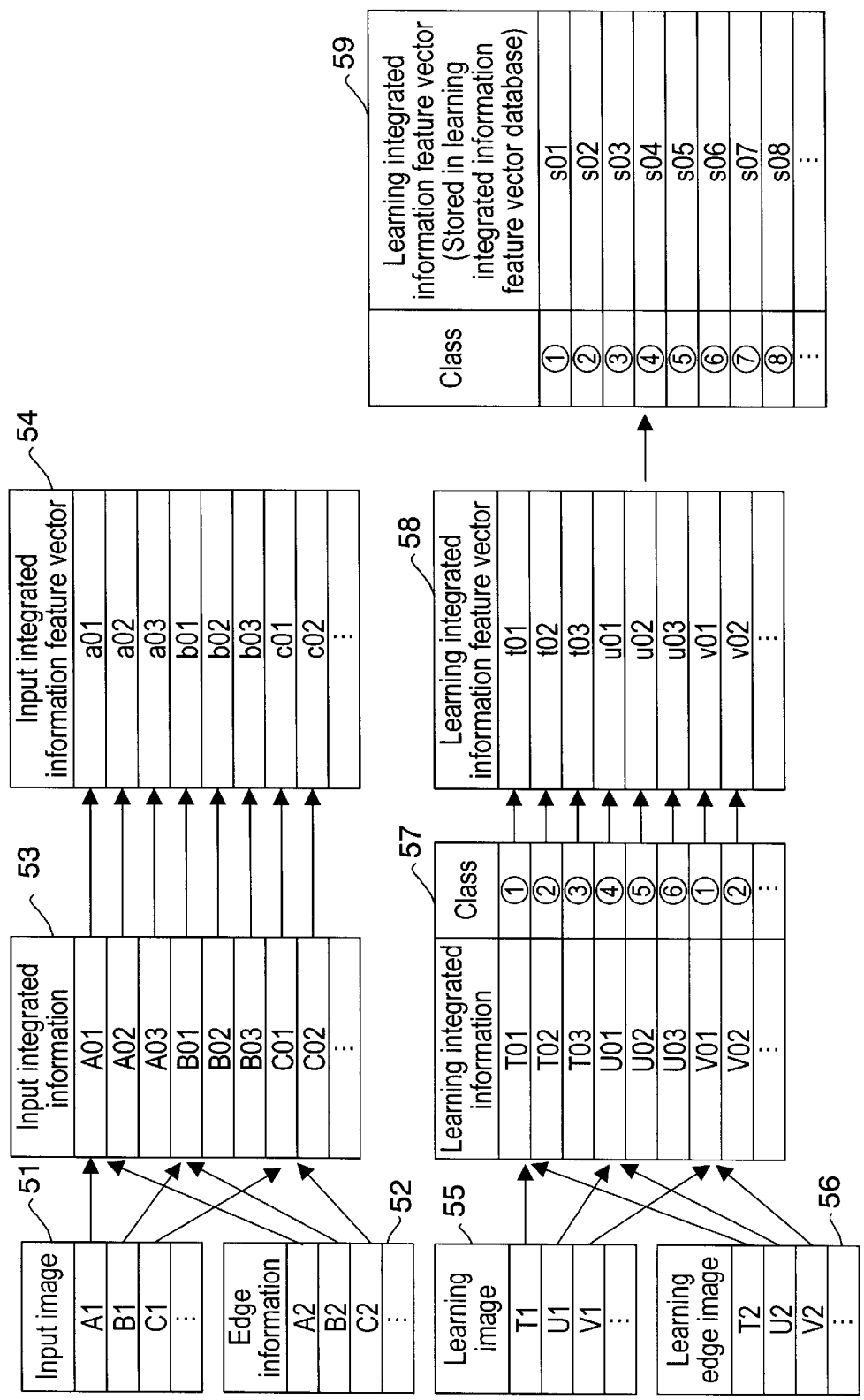
FIG. 17 is a diagram explaining mutual relation of input and learning images, window, and feature vector in embodiment 4 of the invention.

FIG. 17 shows an example of mutual relation of input and learning images, integrated information and feature vectors, and the operation of off-line processing and on-line processing. First, in off-line processing, entering pattern T1 and learning edge image T2 of learning input image 55, pattern T01 of learning integrated information 57 is determined by integrating process, and it is classified, for example, in class 1. The learning integrated information is classified into classes, and the matrix for feature extraction is determined, and the average of the learning integrated information feature vector 58 of each class is determined, and is stored in the learning integrated information feature vector database 59.

Next, in on-line processing, pattern A1 of input image 51 and pattern A2 of edge image 52 are entered, and pattern A01 of input integrated information 53 is determined by integrating process, and by calculation with the matrix for feature extraction determined in the off-line operation, a01 of input integrated information feature vector 54 is determined. Thereafter, the process is same as in 3404 to 3406 in FIG. 16.

In the similarity measure judging process (3405), the normalized correlation between the input integrated information feature vector and learning integrated information feature vector database may be determined in the feature vector space according to formula 8, and the closest class may be judged as the recognition result. Herein, the similarity measure is the highest in the class of the maximum normalized correlation.

Thus, according to the embodiment, taking out plural kinds of information from the input means, integrated information is used, and therefore as compared with the case of using one information only, the difference of class may be expressed more accurately, so that the type of the object may be estimated at higher accuracy.

Fifth Exemplary Embodiment

This embodiment adds the following functions to embodiment 1. In the foregoing embodiments, the image data obtained from the image input unit is cut off in a rectangular form, and the rectangular partial image is used. In the description of this embodiment, since its shape is changed, it is particularly called as pattern. The pixel value of the pattern is expressed in a one-dimensional vector, and this pattern vector is used. The embodiment is not intended to limit the kind of data, size of pattern, or its shape. The configuration of patterns on the data is maybe continuous, discontinuous, overlapping, etc., and is particularly limited. The whole or part of image, or the whole or part converted in a new expression method (for example, edge information) from the whole or part of image may be also used as pattern.

Figure 18:
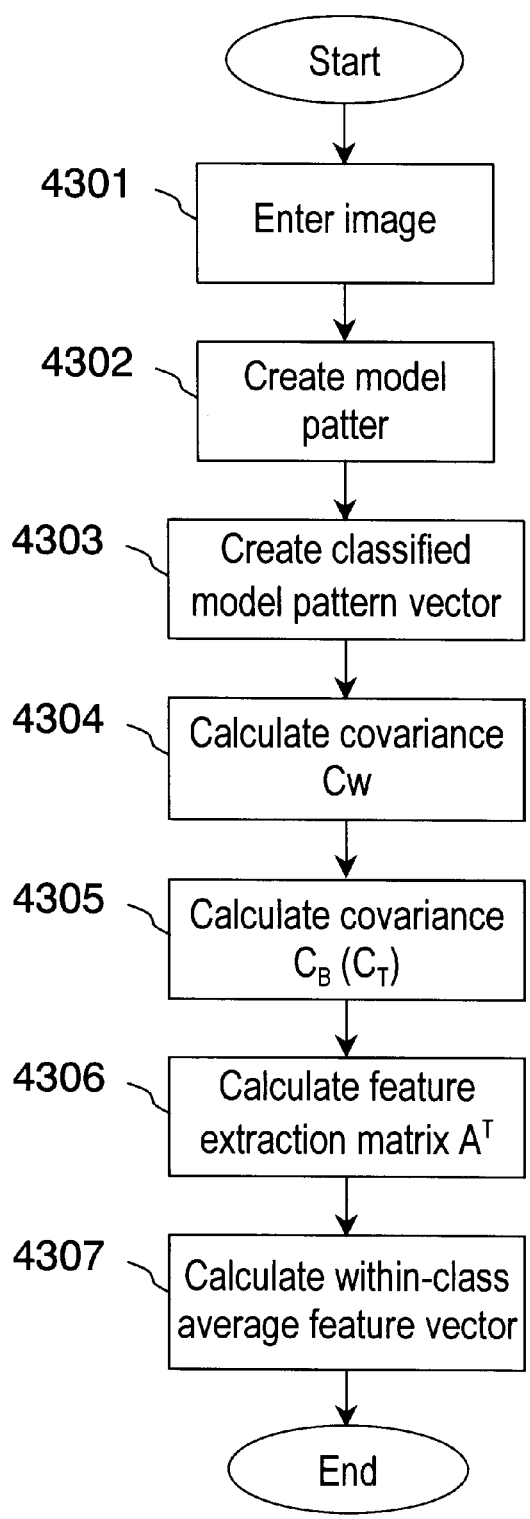
FIG. 18 is a flowchart showing the flow of off-line processing in embodiment 5 of the invention.

First, the off-line processing is explained by reference to FIG. 4 and FIG. 18. FIG. 18 is a flowchart showing the flow of off-line processing. The purpose of off-line processing is to calculate the matrix for feature extraction and build up the model pattern vector database.

The image signal of the object obtained from the video camera 201 is digitally converted, then issued through the I/F 215, and accumulated in the image memory 203. The image of the model taken out from the image data base 202 is accumulated in the image memory 204 (4301).

Taking out the model part from the image once accumulated as model input image in the image memory 203, a model pattern is created (4302). From the model pattern, a pattern vector expressed as a one-dimensional data row of same number of elements is created, and held in the pattern memory 207 (4303).

At step 4303, when creating the pattern vector from the pattern, the model patterns are preliminarily classified into classes by the data for executing discriminant analysis, and scale conversion different in each class is executed, or the shape of the pattern to be taken out in each class is selected, and by thus processing differently in each class, pattern vectors in the same number of elements are created. This is the most important point in this embodiment.

Next, the matrix for feature extraction is calculated in the following procedure according to the content of Fisher discriminant function. In operation, formula 1 to formula 8 are used, same as in embodiment 1, and hence it is omitted here.

From each set of patterns classified in a same class, the within-class covariance matrix $C_W$ is calculated in each class according to formula 1 (4304).

The between-class covariance matrix $C_B$ is calculated according to formula 2 from each set of patterns (4305).

The total class covariance matrix $C_T$ is calculated according to formula 3.

Herein, conforming to the discriminant analysis method, as the criterion of discrimination, the transform (a) is determined to maximize the Fisher ratio (formula 4) so as to be largest in the between-class scatter and smallest in the within-class scatter.

This is equivalent to solution of eigenvalue problem (formula 5), and the obtained $A^T$ is stored in the feature extraction matrix memory 4211 (4306).

The model pattern vector used in learning is registered in the model pattern vector database. The representative value of each class of each model feature vector calculated by using the matrix for feature extraction, for example, the average value is registered in the model feature vector database (4307).

Figure 19:
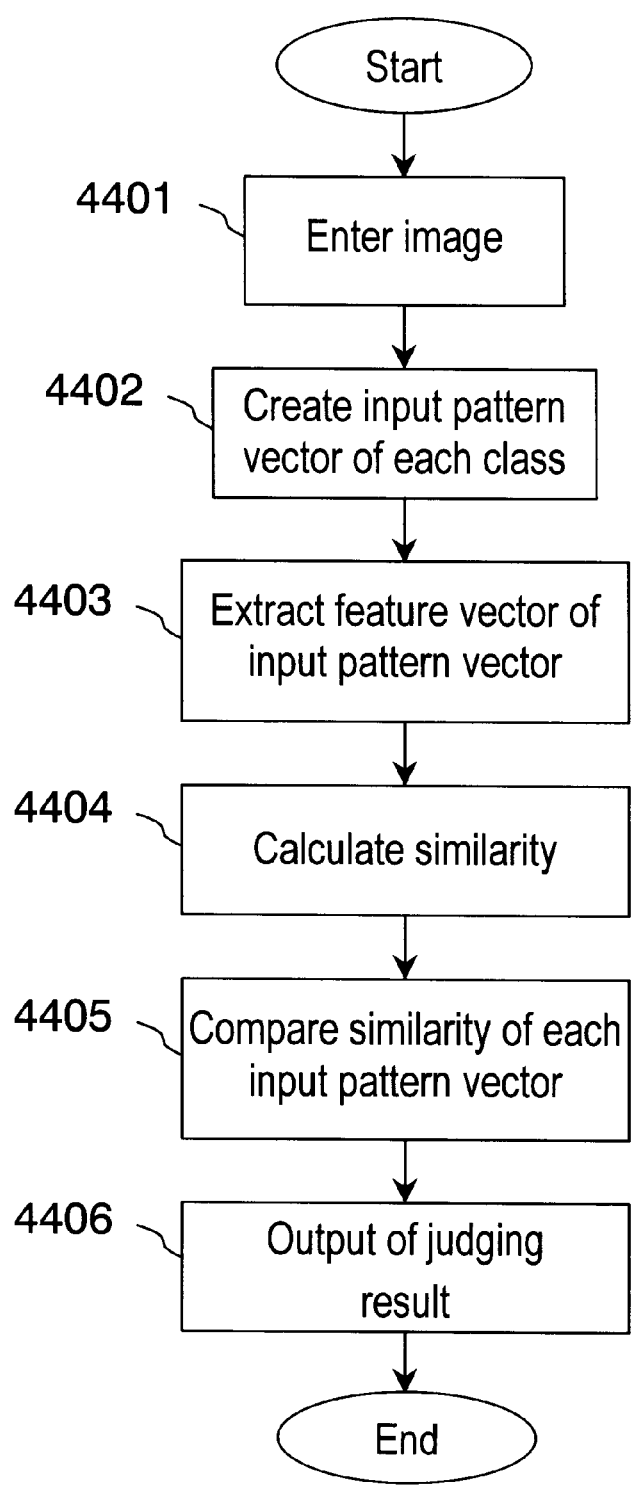
FIG. 19 is a flowchart showing the flow of on-line processing in embodiment 5 of the invention.

The on-line processing is explained next by reference to FIG. 4 and FIG. 19. FIG. 19 is a flowchart showing the flow of on-line processing. The purpose of on-line processing is to select the class most similar to the input image.

The image data as the target object for recognition is entered from the video camera 201, and is stored in the image memory 203 (4401).

From the input images once accumulated in the image memory 203, an input pattern is created according to the method of preparation of pattern vector determined in each class, and the input pattern vector expressed as one-dimensional data row is accumulated in the pattern memory 207 (4402). A mark of input pattern vector, for example, a set of coordinates of the center point of the input image part as input pattern is also accumulated.

Using the feature extraction matrix $A^T$ from the feature extraction matrix memory 211 obtained in the off-line operation, the input feature vector (fa) of the input pattern vector is calculated according to formula 6, and accumulated in the feature vector memory 208 (4403).

Next is explained the optimum matching process, in which the similarity measure is calculated from each input feature vector (fa) and each feature vector (fs) selected from the model feature vector database 212 (4404).

The calculated similarity measures are compared, and the class of the model feature vector of the highest similarity measure is judged as the result of recognition (4405). The judging result of one class or more for the input image is issued to the output terminal 214 through the I/F unit together with the accumulated coordinates of the corresponding input pattern (4406).

Figure 20:
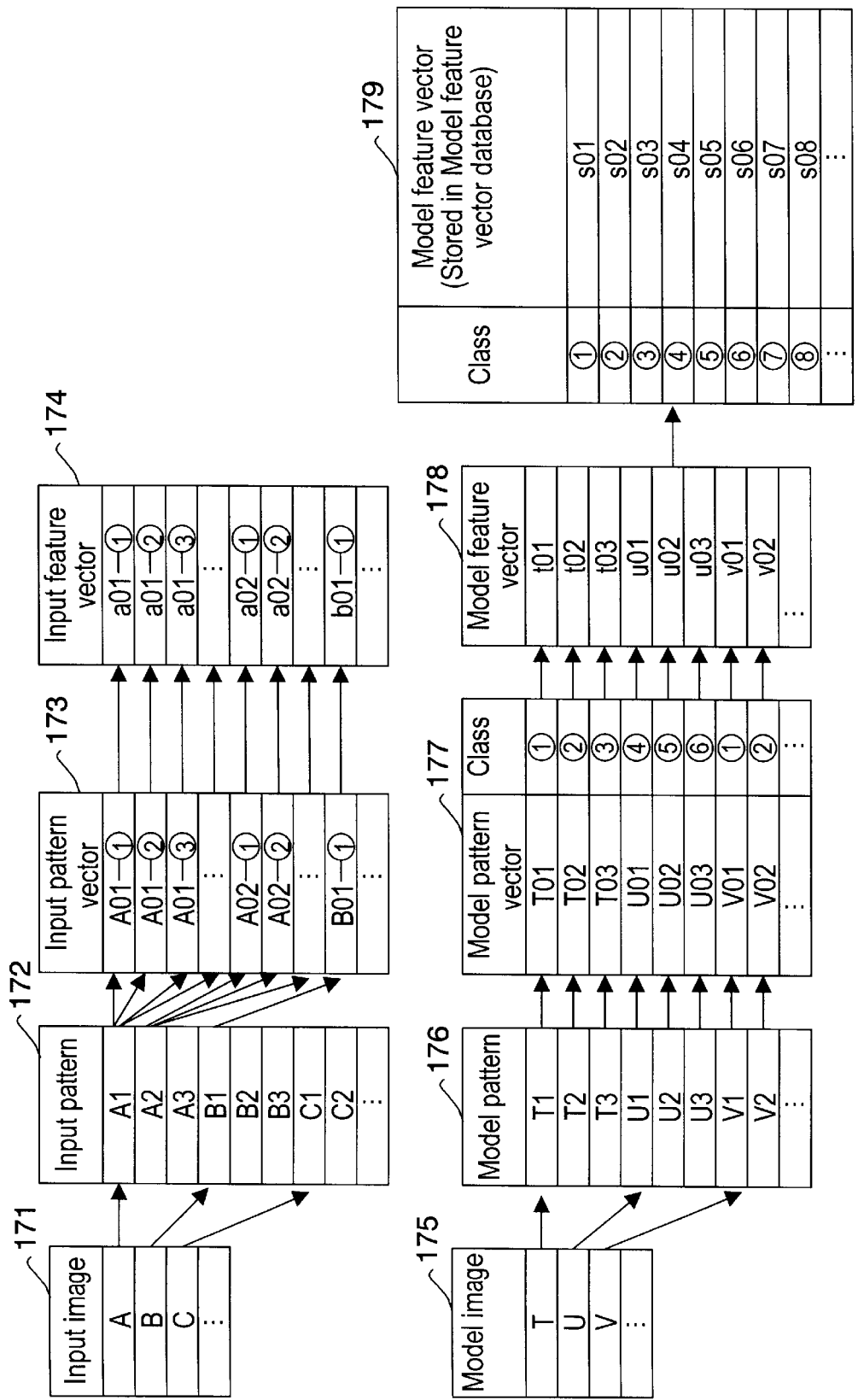
FIG. 20 is a diagram explaining mutual relation of input and learning images, window, and feature vector in embodiment 5 of the invention.

FIG. 20 shows an example of mutual relation of images, patterns, pattern vectors, and feature vectors used in model making at the time of input and learning, and the operation of off-line processing and on-line processing. First, in FIG. 20, in off-line processing, entering T1 of T of pattern 176 from the model input image 175, and classifying into classes, T01 of model pattern vector 177 is determined. From the model pattern vector classified into classes, the matrix for feature extraction is determined, and the average of the model feature vector 178 of each class is determined, and stored in the model feature vector database 179.

Next, in on-line processing, pattern A1 of pattern 172 is entered from 171 of input image A, and A01-(1) and others of input pattern vector 173 are determined in a different method of creation in each class, and by calculation with the matrix for feature extraction determined in the off-line operation, a01-(1) and others of input feature vector 174 are determined. Thereafter, the process is same as in 4404 to 4406 in FIG. 19.

In the similarity judging process (4405), the normalized correlation between the input feature vector and model feature vector of each class may be determined in the feature vector space, and the closest class may be judged as the recognition result.

Figure 21:
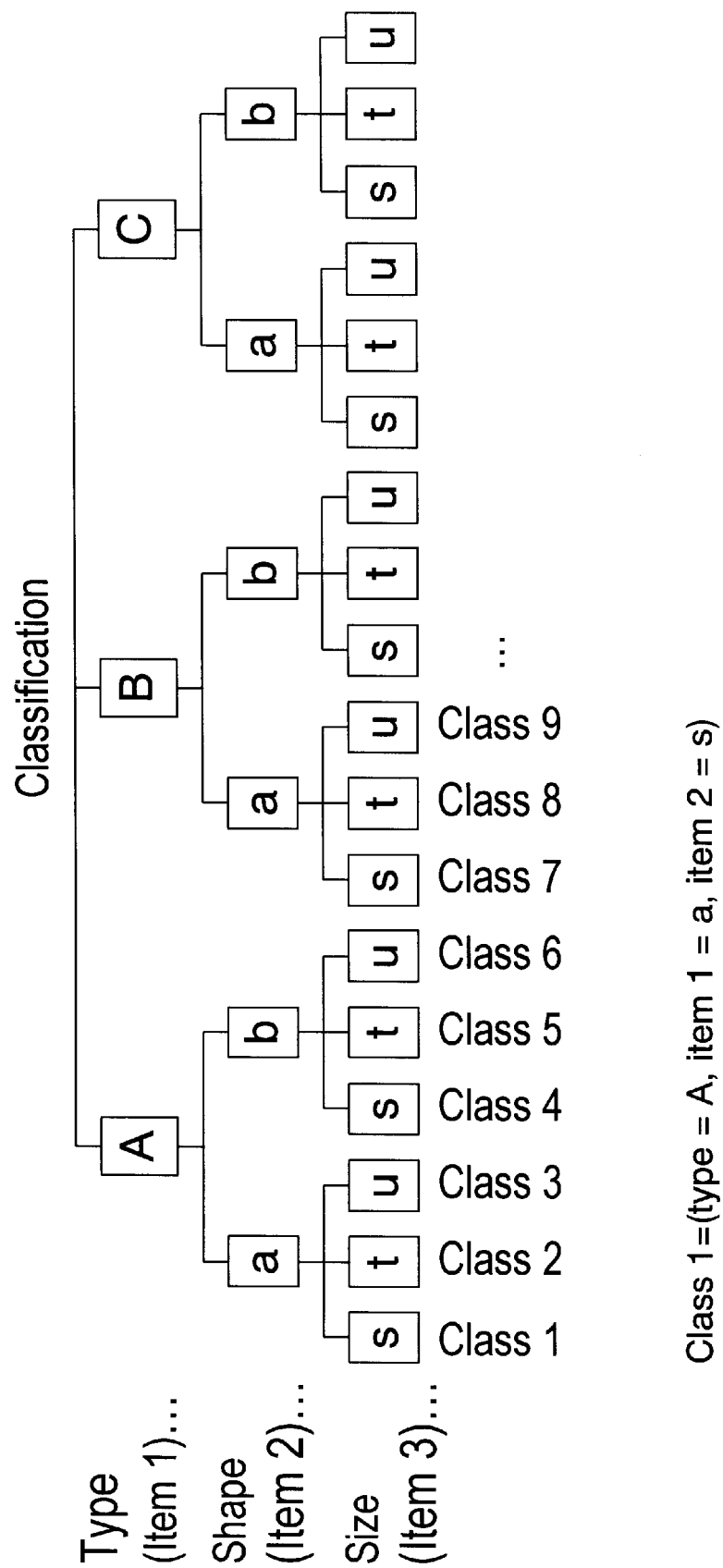
FIG. 21 is an explanatory diagram showing an example of classification method in embodiment 5 of the invention.
Figure 22:
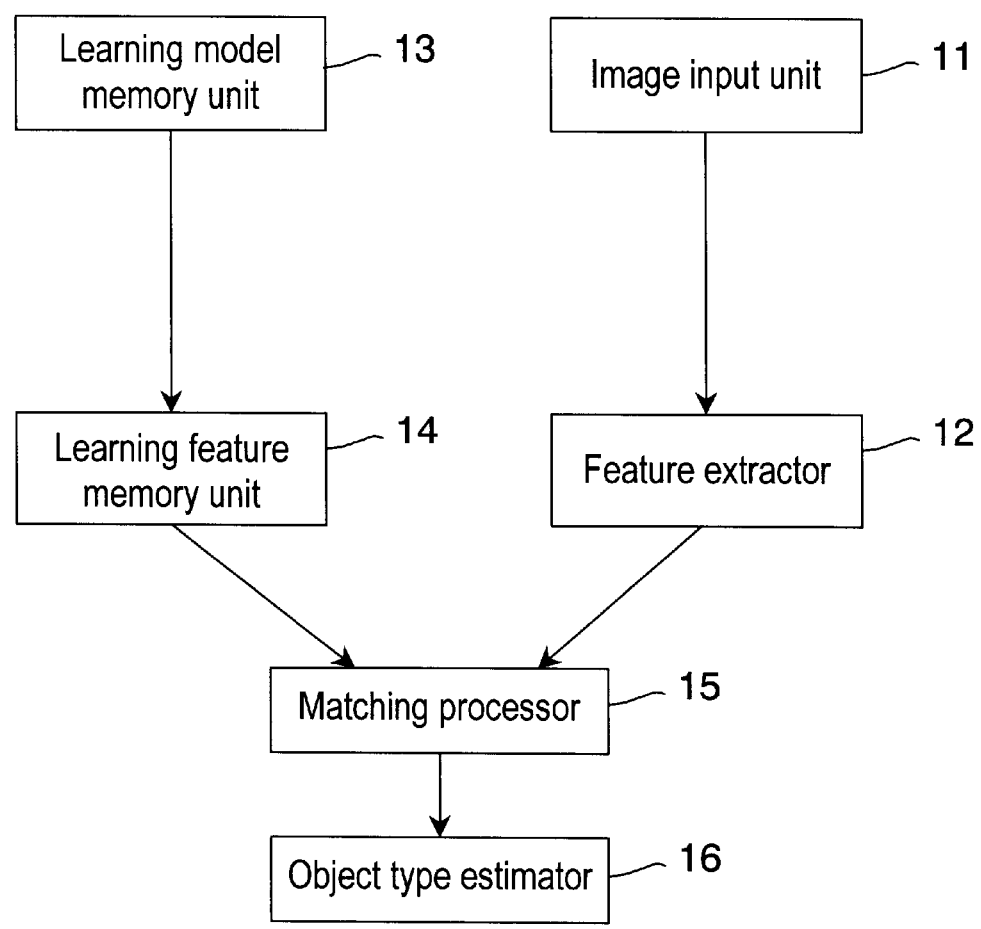
FIG. 22 is a structural diagram showing a conventional example of an object recognition apparatus.

In the model pattern classification method, meanwhile, it is more effective to classify by the kind, shape or size of models. An example of classification is shown in FIG. 21.

Thus, according to the embodiment, as the pattern vectors, since the information of different pattern size or shape in each class, though equal in the number of elements, are stored, as compared with the case of using one pattern vector creating method only in all classes, the difference of class may be expressed more accurately, so that the object may be recognized at higher accuracy.

In all foregoing embodiments, the partial image used in the learning step was obtained from the image by actually taking the object, but it is also possible to create by artificial means such as computer graphics.

The method of recognition of the invention may be also realized by a computer system as already mentioned in the embodiments. Therefore, this method may be written as a program, and may be recorded in a recording medium and distributed.

What is claimed is:

1. An object recognition method comprising at least a learning step of learning a first entered image, and a recognition step of recognizing a second entered image, wherein said learning step includes:

a step of entering the first image including the object to be learned, a step of dividing said entered image into a first partial image, a step of classifying said first partial image into plural classes, a step of calculating a matrix for feature extraction from said partial image classified into classes, a step of calculating a first feature by using said matrix for feature extraction from said partial image classified into classes, and a step of storing the data of said first feature, and said recognition step includes:

a step of receiving a second image including the object to be recognized, step of dividing said entered image into a second partial image, a step of calculating a second feature by using a matrix for feature extraction from said second partial image, a step of calculating the similarity measure of the first image and second image by using said stored first feature data and second feature, a step of recognizing the object in said second image by using said similarity measure, and a step of issuing said result of recognition, wherein the step of entering the first image including the object to be learned is to enter plural pieces of image information mutually different in properties about one object to be learned, said learning step further includes a step of integrating said plural pieces of information and generating first integrated information, said first partial image includes said first integrated information, said step of entering the second image including the object to be recognized is to enter plural pieces of image information mutually different in properties about one object to be recognized, said recognizing step further includes a step of integrating said plural pieces of information and generating second integrated information, and said second partial image includes second integrated information.

2. The object recognition method of claim 1, wherein the step of dividing into first and second partial images is to limit a partial region of input image.

3. The object recognition method of claim 1, wherein said integrated information includes at least optical information and geometrical information.

4. The object recognition method of claim 3, wherein at least the optical information is contrast distribution information of image, or the geometrical information is edge information of image.

5. The object recognition method of claim 1, wherein the class is classified by elements including at least a pair of the object position and kind.

6. The object recognition method, of claim 5, wherein the object position is expressed by the distance to the object.

7. The object recognition method of claim 1, wherein the matrix for feature extraction is determined from the within-class covariance matrix and between-class covariance matrix.

8. The object recognition method of claim 7, wherein the matrix for feature extraction is determined so as to maximize the Fisher ratio calculated from the within-class covariance matrix and between-class covariance matrix.

9. The object recognition method of claim 1, wherein the similarity measure is judged by the normalized correlation in the feature space.

10. An object recognition apparatus comprising at least learning means for learning a first entered image, and recognition means for recognizing a second entered image, wherein said learning means includes:

means for entering the first image including the object to be learned, means for dividing said entered image into a first partial image, means for classifying said first partial image into plural classes, means for calculating a matrix for feature extraction from said partial images image classified into classes, means for calculating a first feature by using said matrix for feature extraction from said partial image classified into classes, and means for storing the data of said first feature, and said recognition means includes:

means for receiving a second image including the object to be recognized, means for dividing said entered image into a second partial image, means for calculating a second feature by using a matrix for feature extraction from said partial image, means for calculating the similarity measure of the first image and second image by using said stored first feature data and second feature, means for recognizing the object in said second image by using said similarity measure, and means for issuing said result of recognition, wherein the means for entering the first image including the object to be learned is to enter plural pieces of image information mutually different in properties about one object to be learned, said learning means further includes a means for integrating said plural pieces of information and generating first integrated information, said first partial image includes said first integrated information, said means for entering the second image including the object to be recognized is to enter plural pieces of image information mutually different in properties about one object to be recognized, said recognizing means further includes a means for integrating said plural pieces of information and generating second integrated information, and said second partial image includes second integrated information.

11. A recording medium in which a computer program is recorded, being a recording medium of which program presents a method, being read by the computer and installed, for recognizing a specific object, said method having at least a learning step of learning a first entered image, and a recognition step of recognizing a second entered image, wherein said learning step includes:

a step of entering the first image including the object to be learned, a step of dividing said entered image into a first partial image, a step of classifying said first partial image into plural classes, a step of calculating a matrix for feature extraction from said partial image classified into classes, a step of calculating a first feature by using said matrix for feature extraction from said partial image classified into classes, and a step of storing the data of said first feature, and said recognition step includes:
- a step of receiving a second image including the object to be recognized,
- a step of dividing said entered image into a second partial image,
- a step of calculating a second feature by using a matrix for feature extraction from said second partial image,
- a step of calculating the similarity measure of the first image and second image by using said stored first feature data and second feature,
- a step of recognizing the object in said second image by using said similarity measure, and
- a step of issuing said result of recognition,
    wherein the step of entering the first image including the object to be learned is to enter plural pieces of image information mutually different in properties about one object to be learned, said learning step further includes a step of integrating said plural pieces of information and generating first integrated information, said first partial image includes said first integrated information, said step of entering the second image including the object to be recognized is to enter plural pieces of image information mutually different in properties about one object to be recognized, said recognizing step further includes a step of integrating said plural pieces of information and generating second integrated information, and said second partial image includes second integrated information.

12. The object recognition method of claim 1, wherein the step of entering the first image and the step of dividing into a first partial image may be replaced by a step of creating by an artificial synthesizing technique.

13. The object recognition method of claim 1, wherein the learning step further includes a step of converting the scale of the first partial image in each class.

14. The object recognition method of claim 1, wherein the learning step further includes a step of cutting out into different shapes in every class when dividing the first partial image.

15. The object recognition method of claim 1, wherein the class is classified by the difference in the shape of said object to be learned.

16. The object recognition method of claim 1, wherein the class is classified by the difference in the size of said object to be learned.

17. The object recognition apparatus of claim 10, wherein the scale of partial image is converted in every class, and a feature vector is created.

18. The object recognition apparatus of claim 10, wherein the cutting shape of partial image is set in every class, and a feature vector is created.

19. The object recognition apparatus of claim 10, wherein the class is classified by the difference in the shape of partial image.

20. The object recognition apparatus of claim 10, wherein the class is classified by the difference in the size of partial image.

* * * * *

UNITED STATES PATENT AND TRADEMARK OFFICE
CERTIFICATE OF CORRECTION

PATENT NO. : 6,647,139 B1
DATED : November 11, 2003
INVENTOR(S) : Mihoko Kunii et al.

It is certified that error appears in the above-identified patent and that said Letters Patent is hereby corrected as shown below:

Title page,
Item [56], References Cited, FOREIGN APPLICATION DOCUMENTS, insert
-- 06266828     09/22/94
   08271223     10/18/96
   09053915     02/25/97 --
OTHER PUBLICATIONS, insert
-- "Visual Learning and Recognition of 3-D Objects From Appearance", Hiroshi Murase et al., International Journal of Computer Vision, 14, pp. 5-24, (1995).

"The Use of Multiple Measurements in Taxonomic Problems", R.A. Fisher, Ann. Eugenics, Vol. 7, Part II, (1936), pp. 179-188. --

Column 15,
Line 14, before the word "step" insert -- a --

Column 16,
Line 12, after the word "partial" delete "images"

Signed and Sealed this

Twenty-second Day of June, 2004

JON W. DUDAS
*Acting Director of the United States Patent and Trademark Office*